US007088765B1

(12) United States Patent
Green et al.

(10) Patent No.: US 7,088,765 B1
(45) Date of Patent: Aug. 8, 2006

(54) VECTOR CALIBRATION SYSTEM

(75) Inventors: Roger A. Green, Fargo, ND (US);
David C. Farden, Fargo, ND (US);
John W. Pierre, Laramie, WY (US);
Richard C. Anderson-Sprecher,
Laramie, WY (US); **Edwin A.
Suominen**, Phoenix, AZ (US)

(73) Assignees: NDSU Research Foundation, Fargo,
ND (US); University of Wyoming,
Laramie, WY (US)

( * ) Notice: Subject to any disclaimer, the term of this patent is extended or adjusted under 35 U.S.C. 154(b) by 764 days.

(21) Appl. No.: 09/730,681

(22) Filed: Dec. 6, 2000

Related U.S. Application Data

(60) Provisional application No. 60/190,226, filed on Mar. 15, 2000.

(51) Int. Cl.
*H04B 1/69* (2006.01)
*H04B 17/02* (2006.01)

(52) U.S. Cl. .................... 375/142; 375/143; 375/144; 375/145

(58) Field of Classification Search ............... 375/224, 375/376, 327, 307, 265, 259, 141, 365, 375
See application file for complete search history.

(56) References Cited

U.S. PATENT DOCUMENTS

| | | | |
|---|---|---|---|
| 3,992,616 A | 11/1976 | Acker | 235/156 |
| 4,003,054 A | 1/1977 | Goldstone | 343/17.7 |
| 4,122,448 A | 10/1978 | Martin | 343/7.7 |
| 4,484,194 A | 11/1984 | Arvidsson | 343/17.7 |
| 4,584,710 A | 4/1986 | Hansen | 455/226 |
| 4,616,229 A | 10/1986 | Taylor, Jr. | 342/171 |
| 4,876,489 A | 10/1989 | Cawthorne | 342/383 |
| 4,926,443 A | 5/1990 | Reich | 375/102 |
| 4,953,182 A | 8/1990 | Chung | 375/97 |
| 4,965,853 A | 10/1990 | Barnard | 455/209 |
| 5,003,314 A | 3/1991 | Berkowitz et al. | 342/372 |

(Continued)

FOREIGN PATENT DOCUMENTS

EP 0 602 394 A2 6/1994

(Continued)

OTHER PUBLICATIONS

Poney et al, 'Mobile Technology for the Human Race'., Vehicular Technology Conference, IEEE 46th Apr. 28-May 1, 1996 vol. 3, pp.: 1589-1593 ☐☐.*

(Continued)

*Primary Examiner*—Jean Corrielus
*Assistant Examiner*—Qutub Ghulamali
(74) *Attorney, Agent, or Firm*—Edwin A. Suominen; Louis J. Hoffman

(57) ABSTRACT

An exemplary signal processing system determines vector mismatch between a plurality of signal paths. Advantageously, the system can determine mismatch across a range of frequencies. A signal generator of the system can provide a periodic calibration signal having a plurality of frequency components. The system frequency can translate the calibration signal to provide a first set of observed samples. The first sample set can be compared to a second set of samples, which can be modeled by a function of parameters including an estimated vector mismatch and a plurality of basis functions. A value of vector mismatch can then be determined (at least to an estimate) that minimizes the difference between the first sample set and the second sample set. Methods and other systems with different advantageous configurations are also described.

39 Claims, 14 Drawing Sheets

U.S. PATENT DOCUMENTS

| | | | |
|---|---|---|---|
| 5,125,008 A | 6/1992 | Trawick et al. | 375/102 |
| 5,188,114 A | 2/1993 | Thiele et al. | 128/661.09 |
| 5,230,099 A | 7/1993 | Loper | 455/324 |
| 5,249,203 A | 9/1993 | Loper | 375/97 |
| 5,315,620 A | 5/1994 | Halawani et al. | 375/102 |
| 5,321,726 A | 6/1994 | Kafadar | 375/79 |
| 5,353,033 A * | 10/1994 | Newberg et al. | 342/375 |
| 5,381,108 A | 1/1995 | Whitmarsh et al. | 330/2 |
| 5,402,449 A | 3/1995 | Schultes et al. | 375/94 |
| 5,461,314 A | 10/1995 | Arakawa et al. | 324/318 |
| 5,483,158 A | 1/1996 | van Heteren et al. | 324/318 |
| 5,504,455 A | 4/1996 | Inkol | 329/304 |
| 5,559,516 A | 9/1996 | Didomizio et al. | 342/118 |
| 5,559,517 A | 9/1996 | Didomizio | 342/156 |
| 5,559,518 A | 9/1996 | DiDomizio | 342/174 |
| 5,568,520 A | 10/1996 | Lindquist et al. | 375/344 |
| 5,604,929 A | 2/1997 | Loper et al. | 455/324 |
| 5,627,863 A * | 5/1997 | Aslanis et al. | 375/357 |
| 5,631,646 A | 5/1997 | Erhage | 341/120 |
| 5,705,949 A | 1/1998 | Alelyunas et al. | 329/304 |
| 5,758,274 A | 5/1998 | Vu et al. | 455/246.1 |
| 5,771,263 A | 6/1998 | Kanazawa et al. | 375/261 |
| 5,784,414 A | 7/1998 | Bruekers et al. | 375/324 |
| 5,809,063 A | 9/1998 | Ashe et al. | 375/206 |
| 5,809,087 A | 9/1998 | Ashe et al. | 375/340 |
| 5,812,927 A | 9/1998 | Ben-Efraim et al. | 455/3.2 |
| 5,812,947 A | 9/1998 | Dent | 455/427 |
| 5,818,383 A | 10/1998 | Stockburger et al. | 342/109 |
| 5,819,157 A | 10/1998 | Ben-Efraim et al. | 455/3.2 |
| 5,822,380 A | 10/1998 | Bottomley | 375/347 |
| 5,826,180 A | 10/1998 | Golan | 455/302 |
| 5,828,955 A | 10/1998 | Lipowski et al. | 455/324 |
| 5,872,538 A | 2/1999 | Fowler | 342/104 |
| 5,883,598 A * | 3/1999 | Parl et al. | 342/457 |
| 5,887,247 A | 3/1999 | Baltus et al. | 455/277.2 |
| 5,896,306 A | 4/1999 | Aschwanden | 364/724.011 |
| 5,905,764 A | 5/1999 | Watanabe et al. | 375/341 |
| 5,933,421 A * | 8/1999 | Alamouti et al. | 370/330 |
| 5,937,341 A | 8/1999 | Suominen | 455/324 |
| 5,950,119 A | 9/1999 | McGeehan et al. | 455/302 |
| 5,987,061 A * | 11/1999 | Chen | 375/222 |
| 6,122,325 A | 9/2000 | Mogre et al. | 375/261 |
| 6,134,261 A * | 10/2000 | Ryan | 375/141 |
| 6,317,589 B1 | 11/2001 | Nash | 455/245.2 |
| 6,353,406 B1 * | 3/2002 | Lanzl et al. | 342/118 |
| 6,456,608 B1 * | 9/2002 | Lomp | 370/335 |
| 6,529,844 B1 * | 3/2003 | Kapetanic et al. | 702/85 |
| 6,563,880 B1 * | 5/2003 | Hunsinger et al. | 375/260 |
| 6,625,222 B1 * | 9/2003 | Bertonis et al. | 375/259 |
| 6,714,776 B1 | 3/2004 | Birleson | 455/302 |

FOREIGN PATENT DOCUMENTS

| | | |
|---|---|---|
| WO | 94/10756 | 5/1994 |

OTHER PUBLICATIONS

Rohling H et al, 'Mobile Technology for the Human Race'., Vehicular Technology Conference, IEEE 46th, Apr. 28-May 1, 1996 vol.: 3, pp.: 1589-1593. □□.*

Yu, Li, and Snelgrove, W. Martin, "A Novel Adaptive Mismatch Cancellation System for Quadrature IF Radio Receivers," *IEEE Transactions on Circuits and Systems—II: Analog and Digital Signal Processing*, vol. 46, No. 6, Jun. 1999, pp. 789-801.

Barel, Alain and Rolain, Yves, A Microwave Multisine with Known Phase for the Calibration of Narrowbanded Nonlinear Vectorial Network Analyzer Measurements, *IEEE MTT-S Digest*, TH3B-6, 1998, pp. 1499-1502.

Dorny, C. Nelson, Least-Square Solution of Redundant Nonlinear Equations for Self-Cohering of Antenna Systems, pp. 397-402 (undated copy).

Frey, Carolin Malott and Muller, Keith E., Analysis Methods for Nonlinear Models with Compound-Symmetric Covariance, *Communications in Statistics—Theory and Methods*, 21(5), pp. 1163-1182 (1992).

Green, Roger Allen, Maximum Likeihood Technique for Quadrature Receiver Parameter Estimation, Master's Thesis, University of Wyoming, Dec. 1994.

Green, R.A.; Pierre, J.W. and Anderson-Sprecher, R.C.; Bias and Variance Analysis of the Maximum Likelihood Estimators of Quadrature Receiver Gain Errors, $7^{th}$ SP Workshop on Statistical Signal & Array Processing, pp. 113-116.

Pierre, J.W. and Fuhrmann, D.R., Considerations in the Autocalibration of Quadrature Receivers, bears notice Copyright 1995, pp. 1900-1903.

Pierre, J.W. and Green, R.A., Maximum Likelihood Technique to Quadrature Parameter Estimation, Copyright 1994, pp. IV-561-IV-564.

Pierre, J.W.; Pappu, R. and Kubichek, R.F.; Effects of Quadrature Receivers Gain Error on Direction-Finding Algorithms, Copyright 1993, pp. 378-381.

Valkama, Mikko and Renfors, Markku, Advanced DSP for I/Q Imbalance Compensation in a Low-IF Receiver, in *IEEE Imternational Conference on Communications*, Jun. 2000, vol. 2 of 3, pp. 768-772.

Author's Manuscript of Green, Roger A. et al, Quadrature receiver Mismatch Calibration, published in *IEEE Transactions on Signal Processing*, Nov. 1999.. vol. 47, No. 11.

Green, Roger A. et al., Quadrature Receiver Mismatch Calibration, reproduction of abstract published in *IEEE Transactions on Signal Processing*, may 1998, vol. 46, No. 5.

Glas, Jack P.F., Digital I/Q Imbalance Compensation in a Low-IF Receiver, in *Proc. IEEE Global Communications Conference*, Sep. 1998, pp. 1-6.

Fernandez-Duran, Alfonso et al., Zero-IF Receiver Architecture for Multistandard Compatible Radio Systems, in *Proc. $46^{th}$ IEEE Vehicular Technology Conference*, May 1996, pp. 1052-1056.

Crols, Jan and Steyaert, Michel S. J., A Single-Chip MHz CMOS Receiver Front-End with a High Performance Low-IF Topology, in *Proc. IEEE Journal of Solid-State Circuits*, Dec. 1995, vol. 30, No. 12, pp. 1483-1492.

Paez-Borrallo, Jose M. et al., Self Calibrating Low IF Digital Image Rejection Receiver for Mobile Communication, believed presented Sep. 1996, pp. 647-650.

Casajus Quiros, Francisco J. and Paez Borrallo, Jose M., A low IF image rejection receiver for DECT, *RACE Mobile Telecommunications Summit*, Cascais, Portugal, Nov. 22-24, 1995, vol. 1.

* cited by examiner

VECTOR CALIBRATION SYSTEM

The present application claims benefit of U.S. Provisional Application No. 60/190,226, filed Mar. 15, 2000, referred to herein as the '226 application. The '226 application is incorporated herein by reference. All U.S. patents or patent applications, published or appended articles, and any other written materials incorporated by reference into the '226 application are also specifically incorporated herein by reference.

BACKGROUND OF THE INVENTION

Communication systems frequently separate signals by using a plurality of signal paths that have a predetermined vector relationship. By suitably combining the signal paths, such systems can cancel out undesired signals by mathematically exploiting predetermined phase and amplitude relationships between respective signal vectors of each signal path.

Quadrature image rejection receivers employ signal paths having a quadrature relationship to discriminate between signals having positive frequency (above DC) and negative frequency (below DC). Quadrature direct conversion receivers separate points in a two-dimensional signal space using the orthogonality of quadrature signals to define axes of the signal space. Array processors couple signal processing circuitry to array elements (e.g., antennas, ultrasonic transducer elements, etc.) via signal paths having particular phase and amplitude relationships to define a desired beam pattern. For example, an array beamformer may provide signal paths to antenna elements of an array with equal phase and a windowed (i.e., tapered) distribution of amplitudes to define a broadside beam having superior sidelobe rejection. The beamformer may vary the gain and/or phase between elements to steer the beam to a particular deviation from broadside.

Many communication systems require precise vector matching between signal paths to achieve a high degree of separation between desired and undesired signals. To obtain 50 dB of quadrature image rejection, for example, an in-phase and quadrature signal are required to have no more than about 0.6% amplitude mismatch and about +0.4 degrees of phase mismatch from quadrature. Comparable levels of vector matching are required between elements of an array having 50 dB of sidelobe rejection.

Conventional communication systems employ digital signal processing to determine vector mismatch between signal paths and correct the mismatch. The precision to which such systems can correct mismatch is limited, however, because the mismatch often varies with frequency and is difficult to determine with enough precision to achieve high separation between desired and undesired signals. Consequently, the need remains for determination of vector mismatch across a range of frequencies and with greater accuracy.

SUMMARY OF THE INVENTION

According to various aspects and methods of the present invention, a signal processing system determines vector mismatch between a plurality of signal paths. Advantageously, such a system can determine mismatch across a range of frequencies. A signal generator can provide a periodic calibration signal having a plurality of frequency components. The system frequency translates the calibration signal to provide a first set of observed samples. The first sample set is compared to a second set of samples, which are modeled by a function of parameters including an estimated vector mismatch and a plurality of basis functions. A value of vector mismatch is determined (at least to an estimate) that minimizes the difference between the first sample set and the second sample set.

According to one advantageous aspect of the invention, the calibration signal comprises multiple tones having predetermined gain, phase and frequency relationships to each other. By providing a periodic calibration signal with a plurality of tones, the signal processing system is able to concurrently determine vector mismatch at the frequency of each tone. Consequently, the system can determine mismatch across a range of frequencies simply and efficiently.

By minimizing the difference between a set of observed samples and a set of samples modeled by basis functions, the system can determine vector mismatch using linear techniques. According to various advantageous aspects of the invention, deterministic least squares can be employed. Straightforward and efficient recursive techniques such as least mean squares (LMS) and recursive (i.e., adaptive) least squares (RLS) can also be employed.

By continuously or periodically updating its determination of vector mismatch, a system according to a further aspect of the invention can accommodate nonstationary (i.e., time-varying) errors.

A system according to another advantageous aspect of the present invention provides a phase-synchronous calibration signal. After frequency translation, components of a phase-synchronous calibration signal are matched in frequency with components of modeled signals, which are mathematically modeled by one or more basis functions. In one such system, a baseband calibration signal that is phase-synchronous with the basis functions is frequency translated to RF with a first mixer and frequency translated again to baseband or a low-IF frequency range with a second mixer or pair of mixers. Advantageously, the first mixer and second mixer (or mixer pair) can be fed by signals from the same local oscillator output. Thus, the frequency-translated calibration signal remains phase-synchronous with the basis functions even when the local oscillator output is subject to phase variations.

A system according to still another advantageous aspect of the present invention provides a plurality of first sample sets. The system determines, at least to an estimate, a plurality of vector mismatch values by comparing each respective first sample set to a respective second sample set modeled by basis functions and minimizing the difference between the compared sample sets. By statistically combining the values of vector mismatch determined for each one of the plurality of first sample sets, such a system can improve accuracy of the mismatch determination while keeping the interval of each sample set relatively short. Sample sets having shorter intervals are less prone to problems caused by local-oscillator induced phase variation between the frequency-translated calibration signal and the basis functions.

Quadrature receiver and array processor systems operating in accordance with further aspects of the invention determine and correct vector mismatch across a range of frequencies, thus providing improved performance. Vector mismatch between in-phase and quadrature signal paths can be more accurately and efficiently determined and corrected across a range of frequencies to improve demodulator performance or image rejection. Similarly, vector mismatch between array elements can be better determined and corrected to improve array efficiency and sidelobe rejection.

BRIEF DESCRIPTION OF THE DRAWING

Various embodiments of the present invention are described below with reference to the drawing, wherein like designations denote like elements.

DESCRIPTION OF PREFERRED EXEMPLARY EMBODIMENTS

Figure 1:
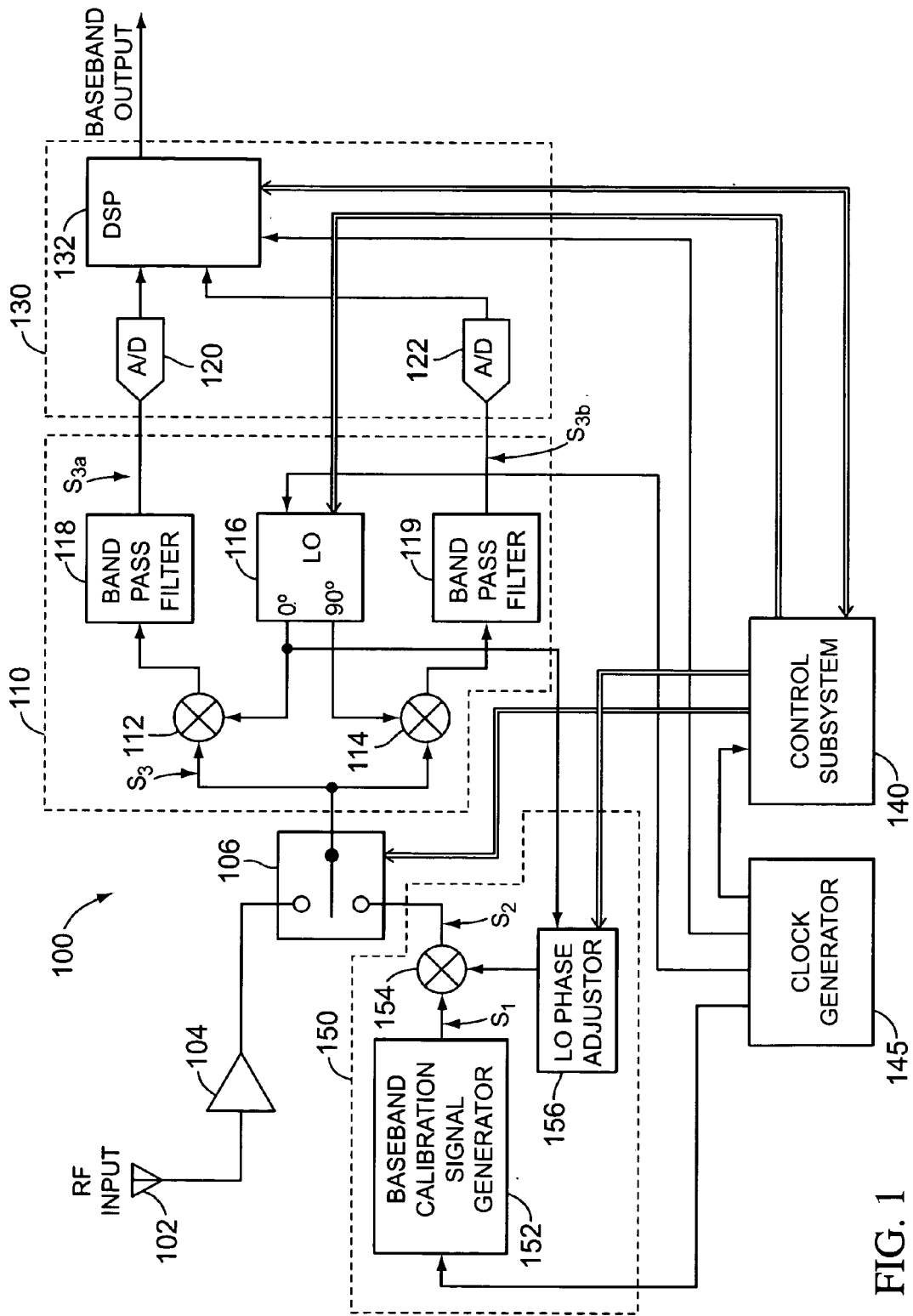
FIG. 1 is a schematic block diagram of a radio receiver implementing functions of a vector calibration system according to various aspects of the present invention.

A vector calibration system according to various aspects of the present invention provides numerous benefits, including concurrently determining vector mismatch between a plurality of signal paths across a range of frequencies. Such a system can be advantageously implemented in any communication system that separates signals using a plurality of signal paths having a predetermined vector relationship. As may be better understood with reference to FIG. 1, for example, a low-IF receiver 100 employs quadrature signal paths to separate desired signals from image signals having opposite frequencies. Conventional low-IF (low intermediate frequency) receivers reduce the complexity of IF processing by performing the processing at frequencies that are much closer to the baseband frequency range of a signal of interest than the RF frequency of the signal. In a receiver variation having circuitry similar to that of receiver 100, quadrature signal paths are employed to separate frequency components of a signal that is directly converted to baseband frequencies. In accordance with the invention, receiver 100 includes hardware and software for correcting mismatch from a quadrature relationship across its low-IF frequency range.

As discussed in detail below, receiver 100 includes, inter alia, a calibration signal subsystem 150 for implementing an exemplary vector calibration system. Receiver 100 also includes circuitry that conventionally converts a selected radio frequency (RF) signal to baseband information. This circuitry includes an RF input port 102 (e.g., a suitable type of coaxial connector), a front-end stage 104, a frequency translation subsystem 110, a digital subsystem 130, a control subsystem 140, and a clock generator 145.

Front-end stage 104 receives RF signals from input port 102 and amplifies the signals using a conventional low-noise amplifier. Preferably, front-end stage 104 selectively amplifies signals from a frequency band of interest (e.g., one of the frequency bands for cellular telephone downlink signals) while at least partially rejecting signals outside the band of interest. Front-end stage 104 couples the amplified signals to frequency translation subsystem 110 through a switching device 106, the purpose of which is discussed below. Frequency translation subsystem 110 conveys the selected RF signal to digital subsystem 130 in a frequency translated, filtered form. Digital subsystem 130 samples and digitizes the selected frequency-translated signal and subjects the signal to further signal processing in the digital domain. Clock generator 145 provides synchronized clock signals to various portions of receiver 100, preferably by dividing down the high frequency output of a high-stability master oscillator (e.g., a temperature-compensated crystal oscillator) by various divide ratios. (Even-numbered divide ratios are preferred, with powers of two being particularly efficient to implement.)

Frequency translation subsystem 110 includes a pair of mixers 112 and 114, a local oscillator 116, and bandpass filters 118 and 119. Local oscillator 116 provides in-phase and quadrature outputs to mixers 112 and 114, respectively. Responsive to the RF input from front-end stage 104 and respective inputs from local oscillator 116, mixers 112 and 114 translate RF signals of interest into in-phase and quadrature signals, respectively, within a low-IF frequency range. The in-phase and quadrature signals are filtered by respective bandpass filters 118 and 119 to perform an initial selection of a relatively narrow frequency range of interest (e.g., one signal channel) within the low-IF frequency range.

Digital subsystem 130 includes A/D converters 120 and 122 and a digital signal processor (DSP) 132. A/D converters 120 and 122 sample the in-phase and quadrature signals, respectively, from frequency translation subsystem 110 and convert the signals into digital data. Bandpass filters 118 and 119 of frequency translation subsystem 110 are preferably configured to substantially reject signals at frequencies above the low-IF frequency range that would alias into the frequency range after sampling. (As set forth in Appendix D, lowpass filters can also be employed.) A/D converters 120 and 122 convey the digital data to DSP 132 in any suitable format, serial or parallel. DSP 132 performs digital signal processing. Preferably, this processing includes (1) selecting a signal of interest from within the low-IF frequency range of the signals represented by the digital data, (2) rejecting signals within an undesired image frequency range opposite the frequency of interest, and (3) translating the signal of interest into a baseband output signal. The baseband output signal can be a spectral copy of the signal of interest that has been frequency translated to baseband frequencies. Alternatively, the baseband output signal can be a representation of baseband information demodulated from the signal of interest.

Functions of frequency translation subsystem 110 and digital subsystem 130 can be implemented by any suitable hardware and/or software. For example, U.S. Pat. No. 5,937,341 issued Aug. 10, 1999 to Suominen discloses suitable hardware and software that provides particular advantages including simplified tuning of local oscillator 116 and reduced computational burden in DSP 132. This aforementioned patent is referred to herein as the '341 patent. The detailed description portion of the '341 patent (and referenced drawing figures) is incorporated herein by reference. The detailed description portions of any patents or patent applications referenced in the '341 patent are also specifically incorporated herein by reference.

As discussed above, receiver 100 employs in-phase and quadrature signal paths to separate signals of interest from image signals having frequencies of equal magnitude but opposite sign (i.e., inverse or mirror frequencies). Circuitry in the in-phase signal path includes mixer 112, bandpass filter 118, and A/D converter 120. Circuitry in the quadrature signal path includes mixer 114, bandpass filter 119, and A/D converter 122. The separation between signals of interest and image signals in receiver 100 is degraded by vector mismatch between the in-phase and quadrature signal paths. (In a variation, a single A/D converter samples both the in-phase and quadrature signals.)

Vector mismatch between the in-phase and quadrature signal paths can arise from a number of sources including deviations from a quadrature relationship between 0 degree and 90 degree output signals of local oscillator 116, variations in mixers 112 and 114, variations in the transfer functions of filters 118 and 119, varying sensitivity of A/D converters 120 and 122, and variations in propagation delay between these components. Frequently, the vector mismatch caused by these sources various as a function of frequency. For example, varying transfer functions of bandpass filters 118 and 119 can cause frequency-dependent vector mismatch across the low-IF frequency range of receiver 100.

Receiver 100 implements functions of a vector calibration system to correct vector mismatch and thus improves separation between signals of interest and image signals. A vector calibration system according to various aspects of the present invention can be implemented by any suitable combination of analog circuitry, digital circuitry, and/or software that controls execution of software-based digital circuitry to perform computations and digital signal processing functions. For example, circuitry of receiver 100 includes circuitry that is configured for implementing an exemplary vector calibration system, including clock generator 145, a calibration signal subsystem 150, switching device 106, and digital subsystem 130. Calibration signal subsystem 150 generates an RF calibration signal S2 having frequency components within the frequency band of interest. Clock generator 145 provides a time base for the calibration signal. Frequency translation subsystem 110 translates the RF calibration signal back down in frequency, (to the low-IF range of frequencies employed by receiver 100) to provide an in-phase calibration signal S3$a$ and a quadrature calibration signal S3$b$.

Figure 4:
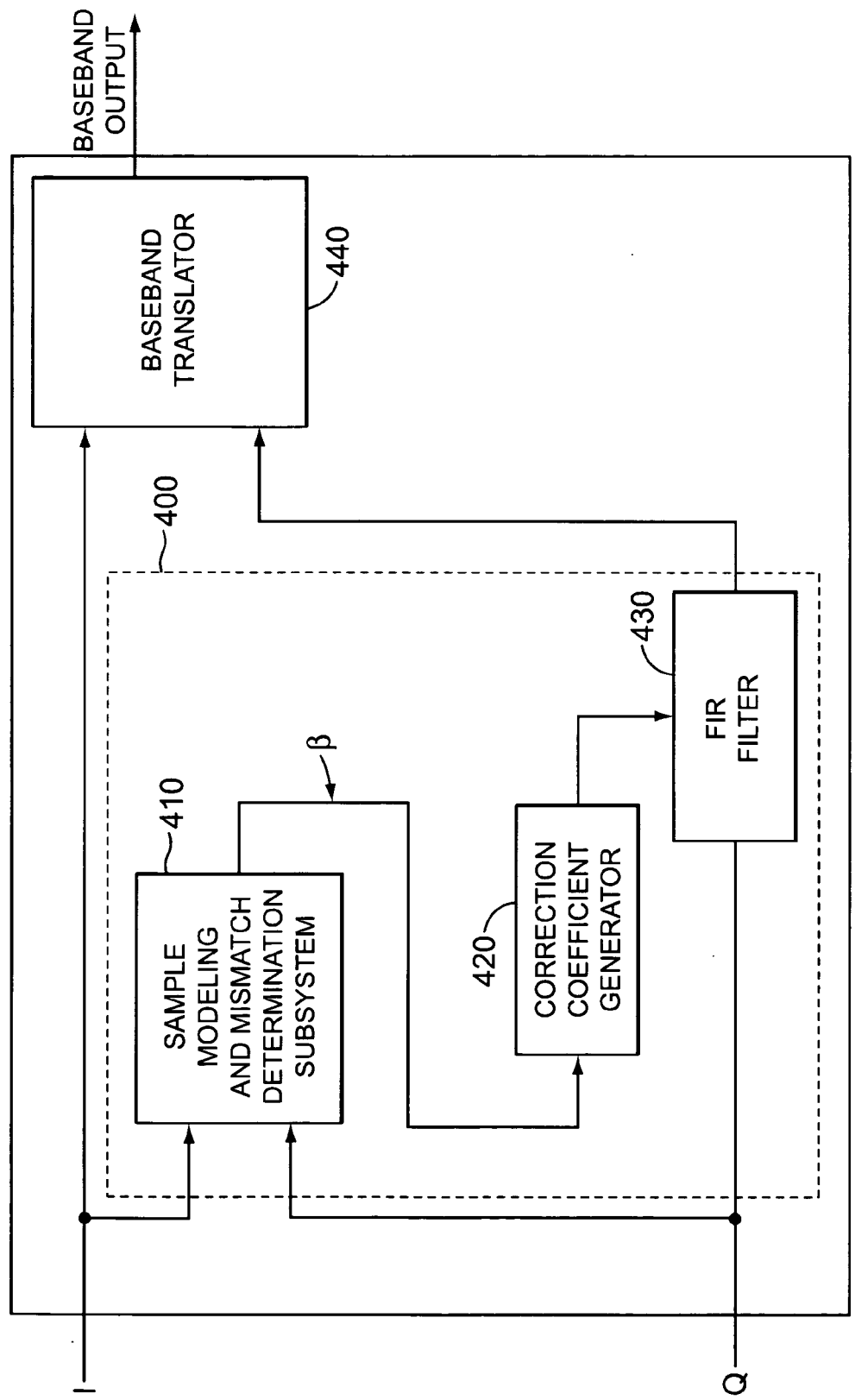
FIG. 4 is a functional block diagram illustrating functions performed according to various aspects of the present invention by the digital signal processor of FIG. 2.

Digital subsystem 130 digitizes calibration signals S3$a$ and S3$b$ to provide a set of observed samples and implements functions of a vector calibration system that determines vector mismatch based on those samples. The vector calibration system also performs suitable digital signal processing to at least partially correct the vector mismatch. An exemplary multi-frequency vector calibration system 400 that can be implemented by hardware and/or software of digital subsystem 130 may be better understood with reference to the functional block diagram of FIG. 4. Digital subsystem 130 also implements functions of a conventional baseband translator 440, for example in accordance with the disclosure of the '341 patent. In a variation employing direct-conversion (e.g., frequency translation directly from RF to baseband) baseband translator 440 can be a conventional quadrature direct-conversion tuner (implemented digitally).

Functional blocks of exemplary system 400 include a sample modeling and mismatch determination subsystem 410, a correction coefficient generator 420, and a digital filter 430. In receiver 100, system 400 receives calibration signals S3$a$ and S3$b$ from frequency translation subsystem 110 via in-phase and quadrature inputs, labeled in FIG. 4 as I and Q. Based on the calibration signals S3$a$ and S3$b$, sample modeling and mismatch determination subsystem 410 determines a mismatch parameter vector $\beta$ that is representative of vector mismatch between the in-phase and quadrature signal paths. Correction coefficient generator 420 converts the mismatch parameter vector $\beta$ into correction coefficients that digital filter 430 employs to correct the vector mismatch.

Sample modeling and mismatch determination subsystem 410 compares the observed samples from digitized calibration signals S3$a$ and S3$b$ to a set of modeled samples, which it generates either as actual samples or conceptually. Subsystem 410 models the modeled samples as a function of parameters including an estimated vector mismatch and a plurality of basis functions. Subsystem 410 determines a value of vector mismatch that minimizes the difference between the observed samples and the modeled samples.

The modeling function can include other parameters, for example indicia of environmental conditions. A communication system implementing vector mismatch calibration according to the invention can include one or more environmental sensors for providing indicia of one or more environmental conditions. One example of an environmental conditions that can influence vector mismatch is temperature of circuitry in the communication system. Another environmental condition that can be determined by circuitry controlling the local oscillator of a communication system is the frequency of local oscillator. The local oscillator may have quadrature signals whose phase relationship varies some-what over a frequency range. Incorporating the local oscillator frequency into the model may help improve its accuracy.

Vector β can consist of the amplitudes of each basis function used to model samples matching the observed samples of signals S3a and S3b. This exemplary form of parameter vector β is discussed in detail below with reference to FIGS. 5–7 and Appendices A, B, and C, which are integral to the specification of this application and incorporated by reference as discussed below.

Correction coefficient generator 420 and digital filter 430 can cooperate in any suitable manner to correct vector mismatch based on a mismatch parameter vector β. When vector β represents amplitudes of modeling basis functions, for example, correction coefficient generator 420 can compute amplitude and phase mismatch between signal paths based on the basis function amplitudes. Appendix A describes an example of such a computation, particularly with reference to equations labeled (11) and (12).

Advantageously, calibration signals S3a and S3b have multiple tones in exemplary receiver 100 and system 400. (Appendix B discloses a two-tone calibration signal.) Using the values of amplitude and phase mismatch that it computes at each tone of calibration signals S3a and S3b, generator 420 can form complex exponentials corresponding to frequency-dependent vector mismatch. Generator 420 can then derive coefficients of an impulse response that is inversely representative of the vector mismatch based on the complex exponentials. Generator 420 can derive these coefficients by applying the complex exponentials to appropriate frequency bands of an inverse fast Fourier transform (IFFT). Digital filter 430 realizes this impulse response, preferably as an finite-impulse-response (FIR) filter.

In a variation of subsystem 400, a conventional adaptive FIR is employed to correct vector mismatch without the need for the vector mismatch to be determined. Since the desired relationship of calibration signals S3a and S3b to baseband calibration signal S1 is known (or easily determined), an error signal (i.e., the difference between observed and modeled samples) can be generated that reflects the deviation(s) of S3a and S3b from the ideal. This error signal can then be incorporated into a conventional LMS algorithm for determining the adaptive FIR filter coefficients. In this advantageous variation, the estimated parameter vector directly contains the FIR filter coefficients. In this variation, the difference between the first sample set (observed samples) and the second sample set (actual or conceptual modeled samples) is minimized not to determine a value of vector mismatch, but to correct the mismatch without needing to know what it is.

Operation of exemplary receiver 100 and vector calibration system 400 may be better understood with reference to simulation plots of FIGS. 8–15. In the simulation, receiver 100 is a low-IF receiver configured to select one of three frequency-translated channels from a low-IF frequency range between 60 kHz and 120 kHz. The three channels have 20 kHz bandwidth and are adjacent. If desired, receiver 100 can be configured in accordance with the disclosure of the '341 patent to obtain improved digital signal processing efficiency and doubled local oscillator step size (e.g., 120 kHz instead of 60 kHz). Calibration signal subsystem 150 provides RF calibration signal S2 with components at three offset frequencies above and below the output frequency of local oscillator 116. These offset frequencies are +/−70 kHz, +/−90 kHz, and +/−110 kHz. Frequency translation subsystem 110 converts signal S2 into in-phase and quadrature signals S3a and S3b using the same output frequency of local oscillator 116. Thus, signals S3a and S3b each contain three tones (at 70, 90, and 110 kHz), which are matched to the offset frequencies of signal S2. (The simulation assumes that frequency translation of signals S1, S2, and S3a, S3b causes no gain or phase distortion of the calibration signals.)

Figure 8:
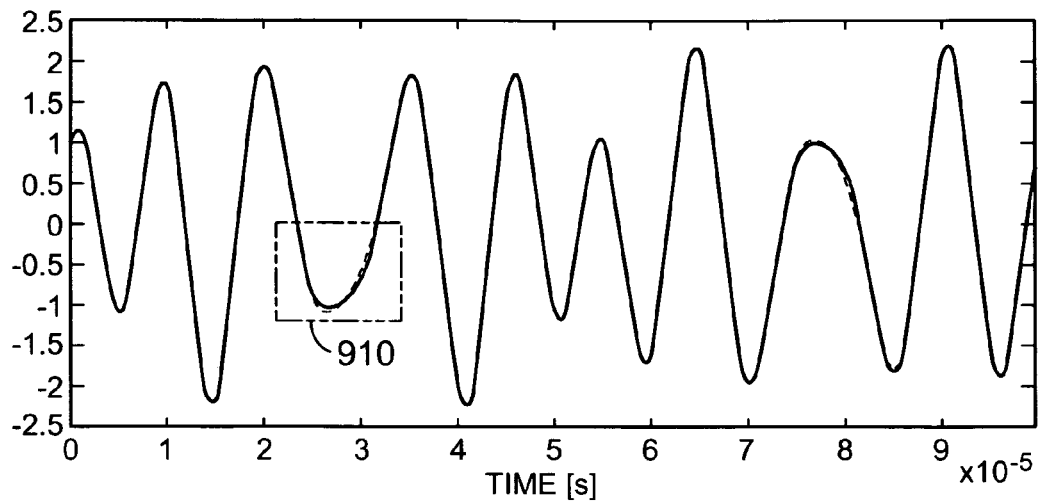
FIGS. 8–10 are simulated time-domain plots illustrating frequency-translated quadrature calibration signals suitable for use in the receiver of FIG. 1, wherein the signals are mismatched in phase from a quadrature relationship.
Figure 9:
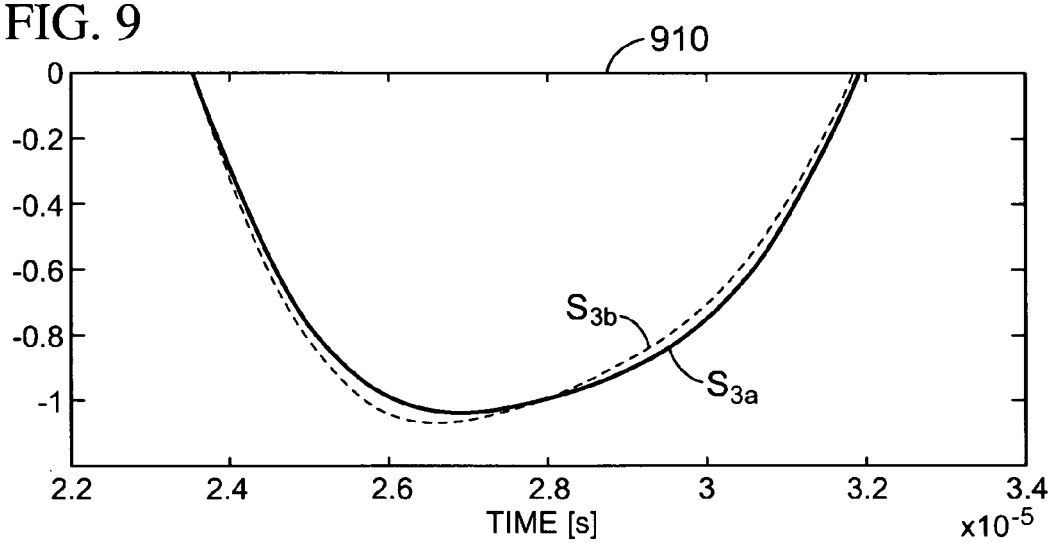
Figure 10:
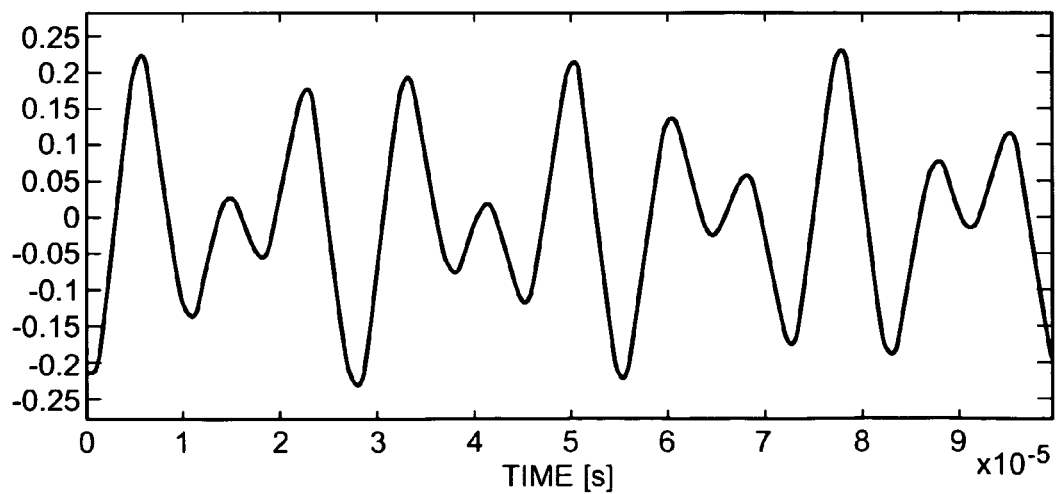
Figure 11:
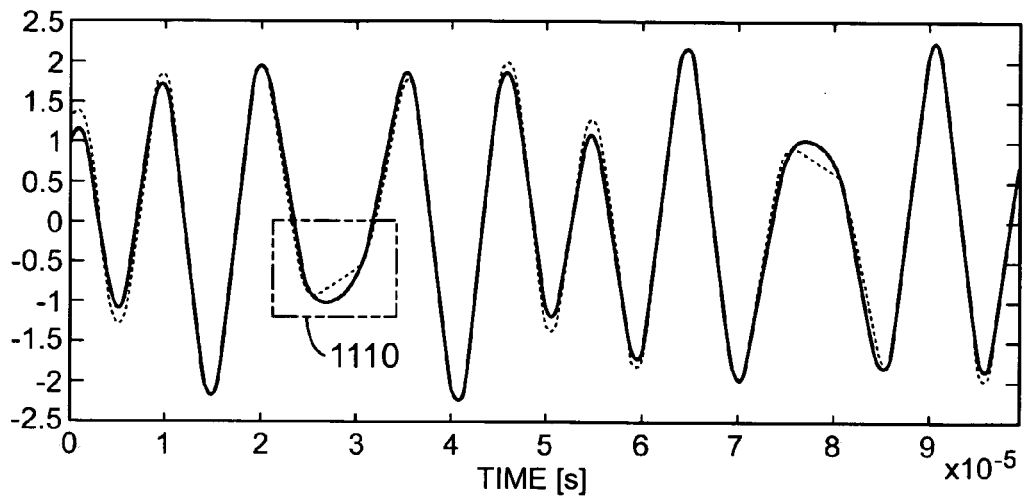
FIGS. 11–13 are simulated time-domain plots illustrating frequency-translated quadrature calibration signals suitable for use in the receiver of FIG. 1, wherein the signals are mismatched in amplitude from a quadrature relationship.
Figure 12:
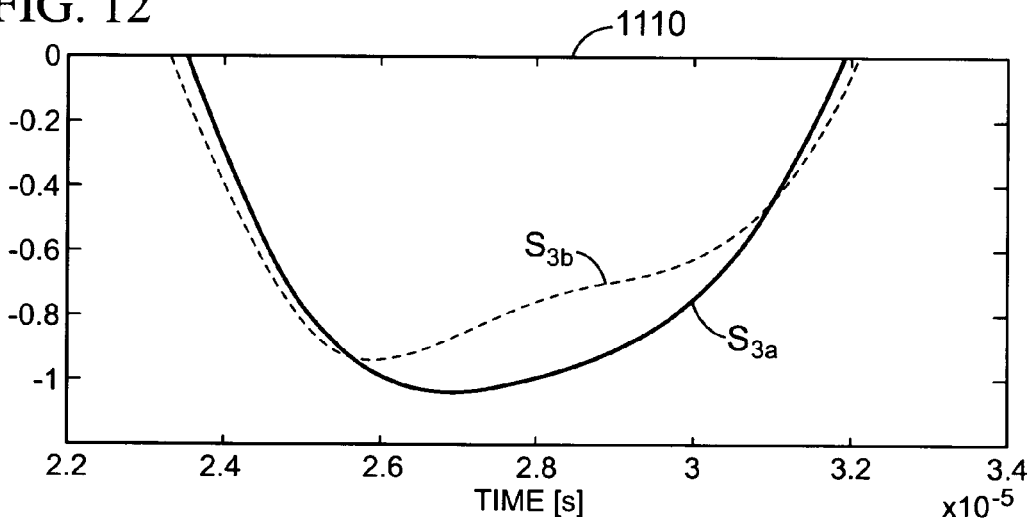
Figure 13:
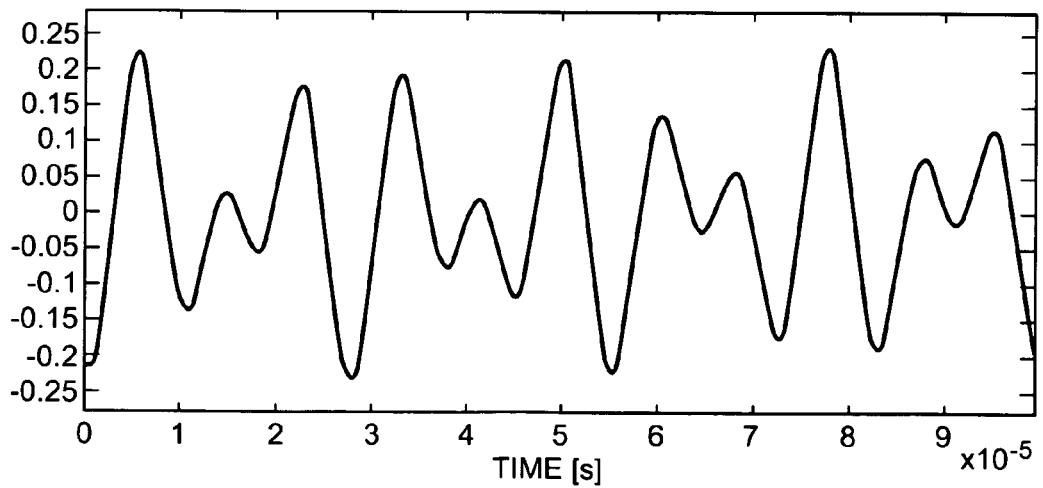
Figure 14:
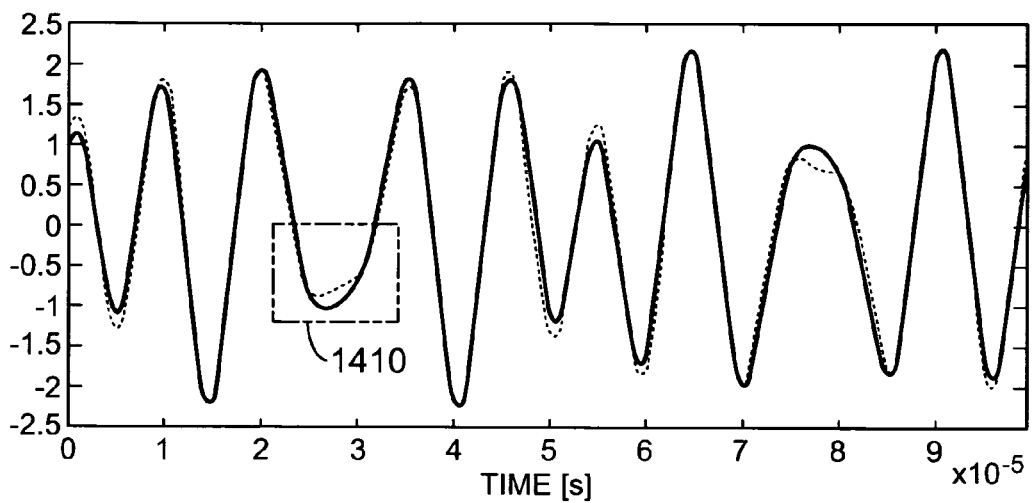
FIGS. 14–16 are simulated time-domain plots illustrating frequency-translated quadrature calibration signals suitable for use in the receiver of FIG. 1, wherein the signals are mismatched in both phase and amplitude from a quadrature relationship.
Figure 15:
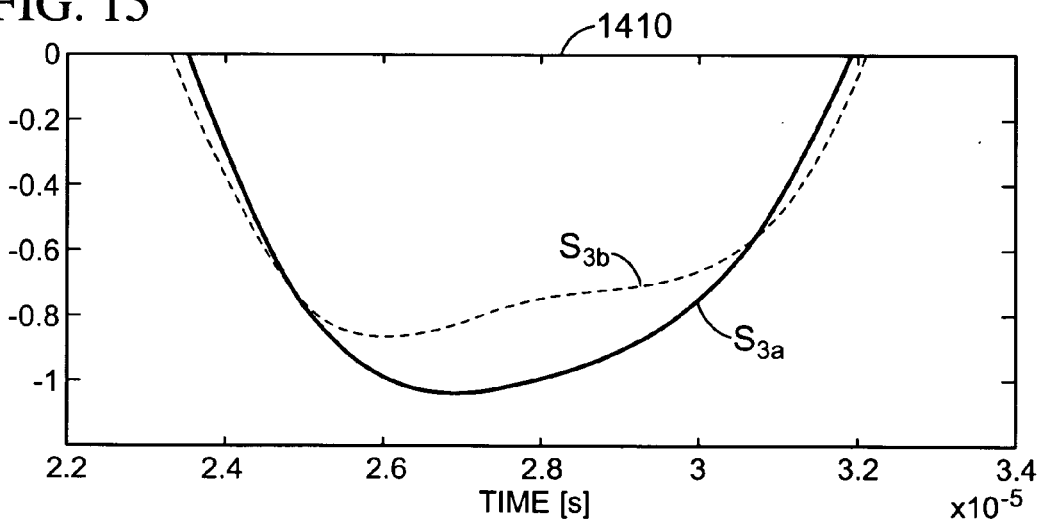
Figure 16:
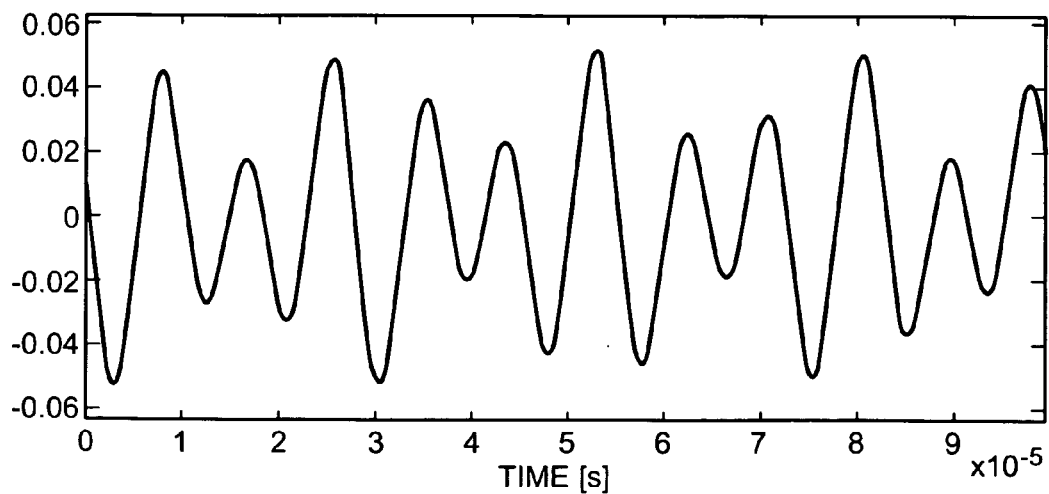

Vector mismatch between signal paths of frequency translation subsystem 110 causes calibration signal S3a and S3b to differ. FIGS. 8, 11, and 14 are time-domain plots illustrating calibration signals S3a and S3b on the same axes with differences caused by phase-only, amplitude-only, and phase/amplitude types of vector mismatch. FIGS. 8–10 illustrate differences caused by phase mismatch between signal paths, FIGS. 11–13 illustrate differences caused by amplitude mismatch, and FIGS. 14–16 illustrate differences caused by vector mismatch comprising both phase and amplitude mismatch. In FIGS. 8–10, the 70, 90, and 110 kHz tones of signals S3a and S3b have relative amplitudes (i.e., amplitude-type vector mismatch) of −1, 0, and +1 dB, respectively. In FIGS. 11–13, these tones have relative phases (i.e., phase-type vector mismatch) of +1, 0, −2 degrees, respectively. In FIGS. 14–16, these tones have the combined vector mismatches illustrated in FIGS. 8–10 and FIGS. 11–13 (phase/amplitude-type vector mismatch).

Each plot of FIGS. 8–10 includes a respective dashed box 910, 1110, and 1410 highlighting a sub-interval within the interval of the plots. In this time interval, differences between signals S3a and S3b are particularly apparent. FIGS. 9, 12, and 15 are time-domain plots illustrating calibration signals S3a and S3b within the sub-interval of dashed boxes 910, 1110, and 1410. FIGS. 10, 13, and 16 are time-domain plots illustrating signals of the difference between the calibration signals S3a and S3b (i.e., a residual signal) illustrated in FIGS. 8, 11, and 14, respectively.

A vector mismatch calibration system according to various aspects of the present invention determines (at least to an estimate) a value of vector mismatch that minimizes (at least down to an acceptable local minimum or the system noise level) the difference between samples of an observed calibration signal and samples of a modeled calibration signal. The system compares the observed samples to the modeled samples without the modeled samples necessarily needing to be stored in any separate form. In other words, the modeled samples may exist only mathematically in the equations used during comparison. The system generates the modeled samples (again, not necessarily as actual data values) by a mathematical function of parameters including (1) an estimated vector mismatch (e.g., estimated phase and/or amplitude) and (2) a plurality of basis functions. This modeling is discussed in further detail below with reference to FIGS. 4–7. The parameters can also include indicia of environmental conditions such as temperature or local oscillator frequency.

An actual vector calibration system of the invention using discrete-time processing compares samples of observed and modeled signals rather than actual continuous-time signals. However, the comparison process may better understood (with reference to the plots of FIGS. 8–10) by viewing signal S3b as the observed signal and signal S3a as the modeled calibration signal. The more the system can minimize the difference between signals S3a and S3b, the smaller the residual signal of FIGS. 10, 13, and 16 will become. To minimize this difference and thus model the observed calibration signal, the system seeks to minimize the amplitude of the residual signal, either iteratively or deterministically.

Initially, the residual signal can be expected to have a relatively high amplitude because the absolute phase of the observed calibration signal is not known. In receiver 100, the observed calibration signals S3a and S3b are filtered component signals of a frequency-translated calibration signal S3, which is derived from RF calibration signal S2, which is a frequency-translated copy of baseband calibration signal S1. In other words, the signal flow is as follows: S1 (baseband) to S2 (RF) to S3 (frequency-translated) to S3a and S3b (filtered, quadrature split). Even though the modeled calibration signal can be matched relatively closely in phase to the originating baseband calibration signal S3, the intervening signal processing that converts signal S3 to observed calibration signal S3a or S3b causes unpredictable phase offsets. Fortunately, the absolute phase is unimportant. The inventive vector mismatch calibration system only needs to determine the relative phases between two or more signal paths, not their absolute phase delay.

Figure 17:
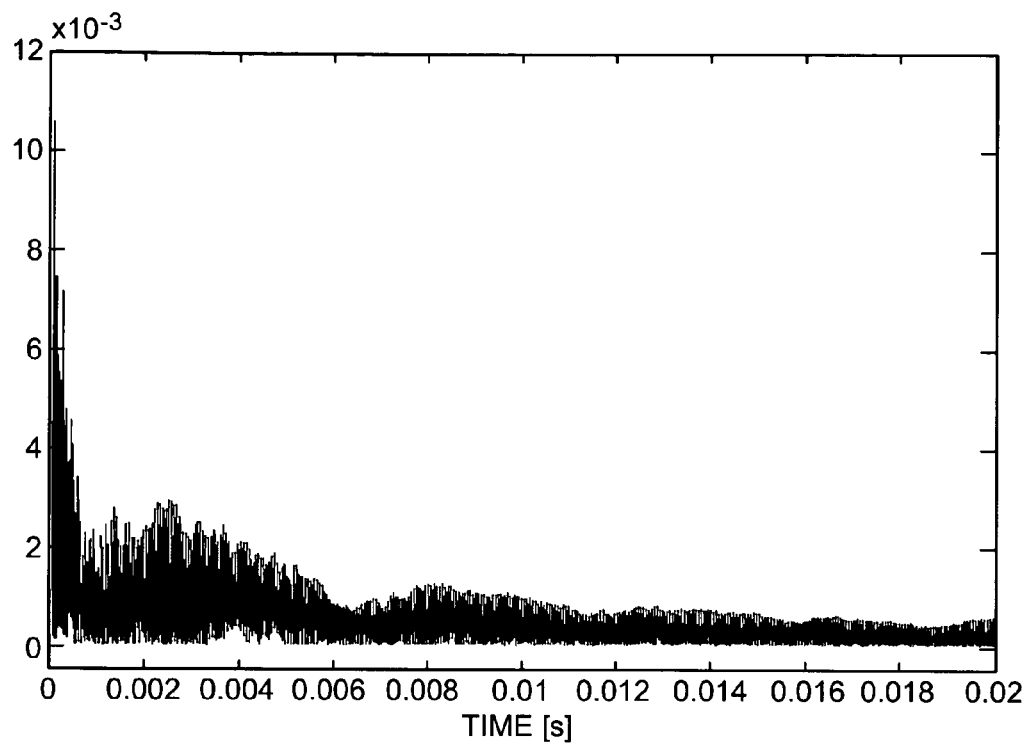
FIGS. 17 and 18 are simulated plots of a residual signal envelope and smoothed envelope, respectively, illustrating reduction of the difference between an observed calibration signal and a modeled calibration signal during simulated operation of vector mismatch calibration according to various aspects of the present invention.
Figure 18:
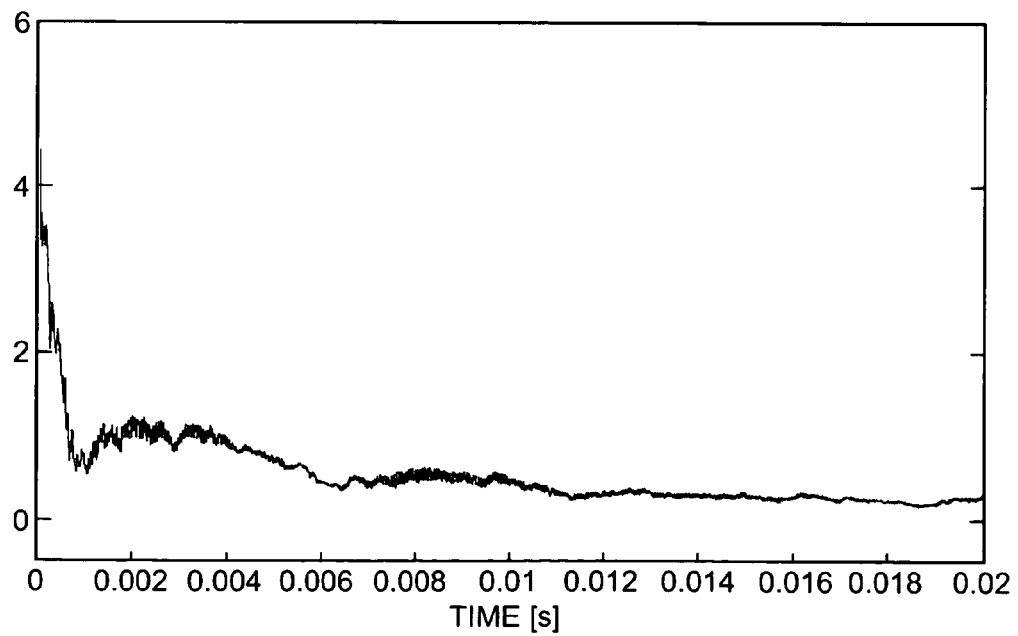

FIGS. 17 and 18 are simulated plots of a residual signal envelope and smoothed envelope, respectively, illustrating reduction of the residual signal during operation of the vector calibration system. As the residual signal amplitude diminishes, the modeled calibration signal more closely approximates the observed calibration signal and the vector calibration system converges to a more accurate determination of vector mismatch.

Figure 19:
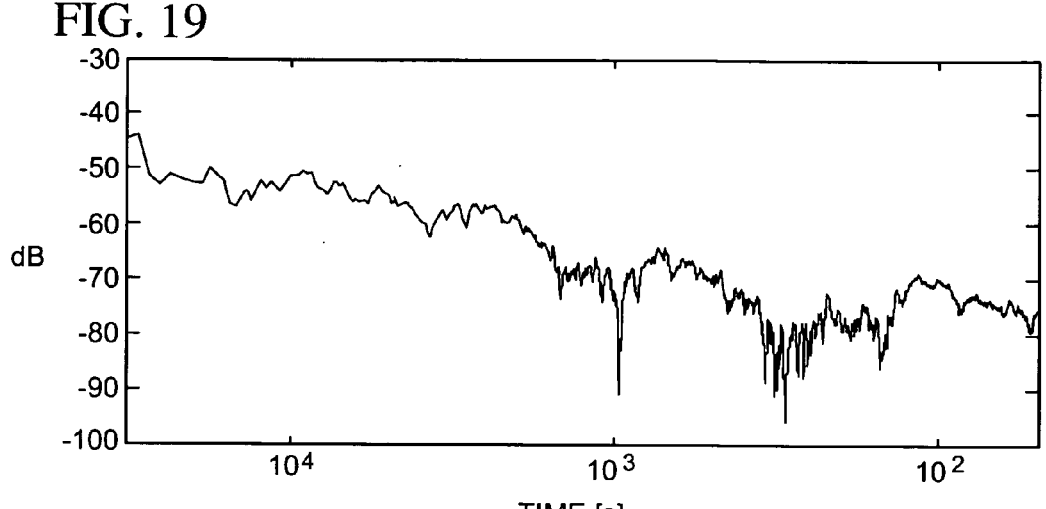
FIGS. 19–21 are simulated plots of relative amplitude (in dB) of an undesired image signal, illustrating improvement in image rejection during simulated operation of vector mismatch calibration according to various aspects of the present invention.
Figure 20:
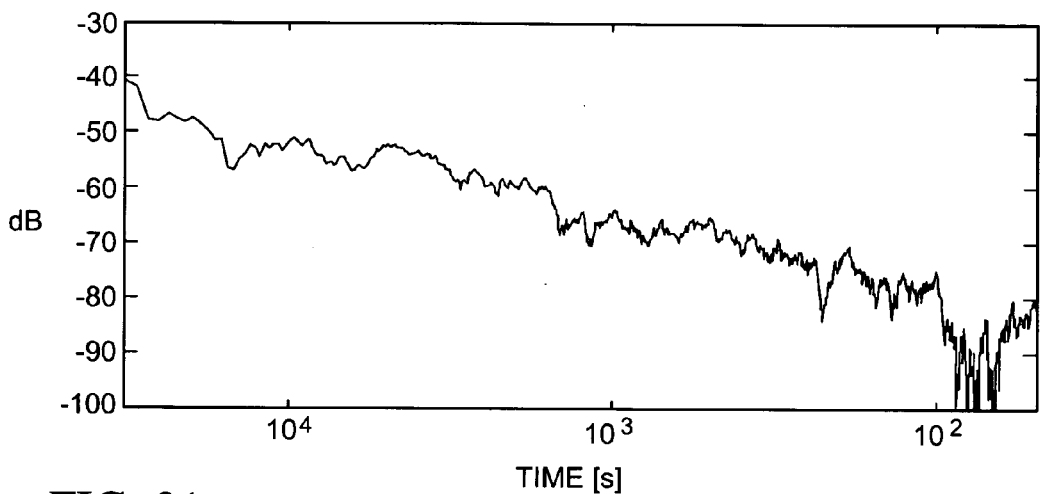
Figure 21:
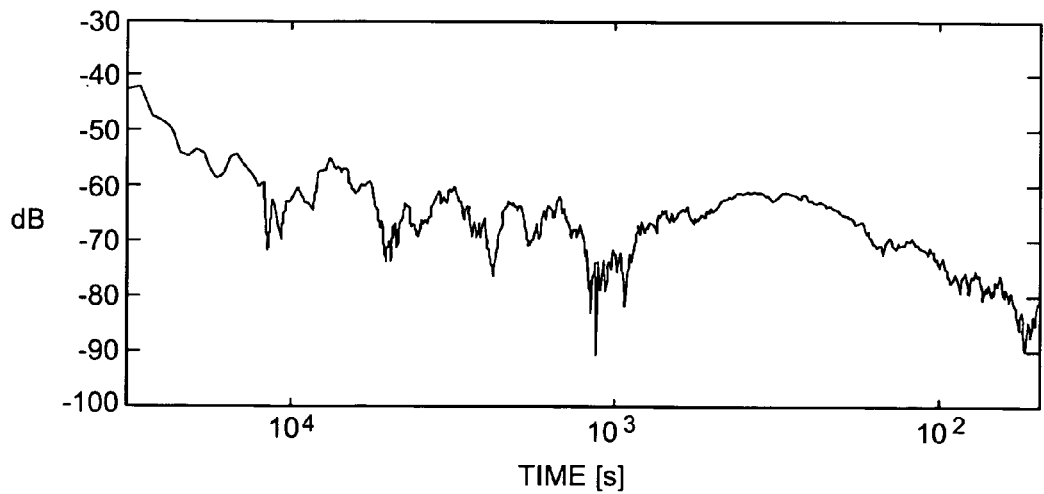

FIGS. 19–21 are simulated plots of the relative amplitude of an undesired image signal (in dB), illustrating increasing image rejection during operation of the vector calibration system. FIG. 19 illustrate undesired image signal amplitude at the center of the 70 kHz channel of exemplary receiver 100, while FIGS. 20 and 21 illustrate undesired image signal amplitude for the 90 and 110 kHz channels, respectively. As the system converges to a more accurate determination of vector mismatch, the mismatch can be corrected more accurately. Image rejection improves as a result.

FIGS. 22–25 are simulated frequency-domain plots illustrating frequency response of analog and digital filters of exemplary receiver 100. Receiver 100 implements analog (i.e., continuous-time) filtering in bandpass filters 118 and 119, and implements digital (i.e., discrete-time) filtering as part of sample modeling and mismatch determination subsystem 410. Subsystem 410 performs digital filtering of the in-phase and quadrature signals entering digital subsystem 130 before it performs sample modeling and mismatch determination. Because exemplary calibration signals S3a and S3b of receiver 100 contain tones only at desired frequencies, filtering can be omitted for simplicity but at the expense of increased overall noise levels. In variations where the calibration signal(s) contain undesired tones, filtering is more important to ensure convergence of sample modeling.

Figure 22:
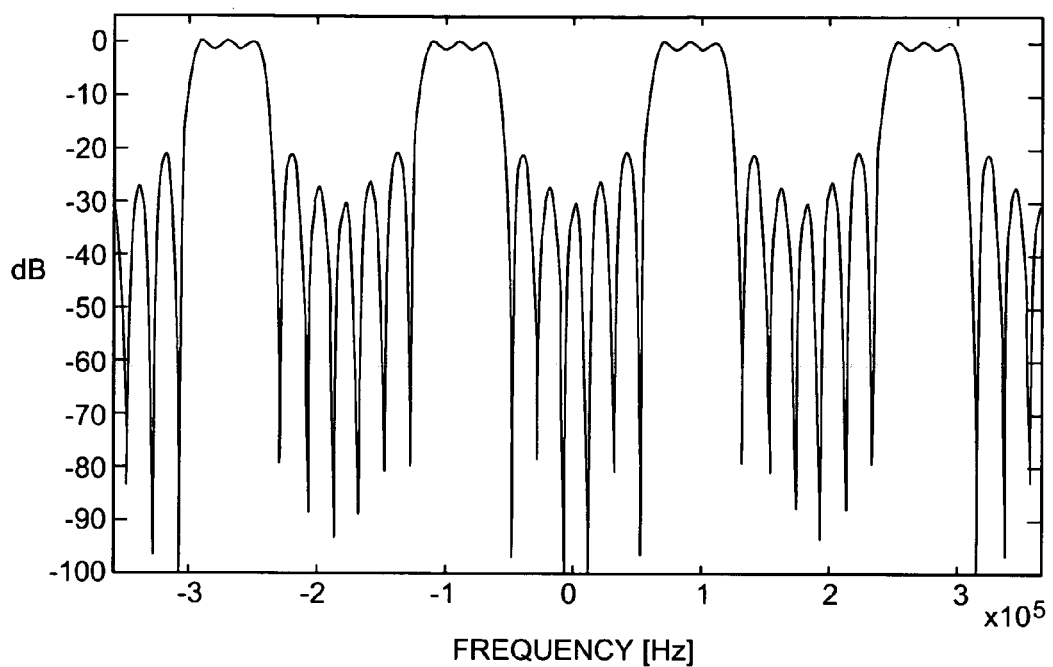
FIG. 22 is a simulated frequency-domain plot illustrating frequency response of an exemplary noise reduction filter that may be used during vector mismatch calibration according to various aspects of the present invention.
Figure 23:
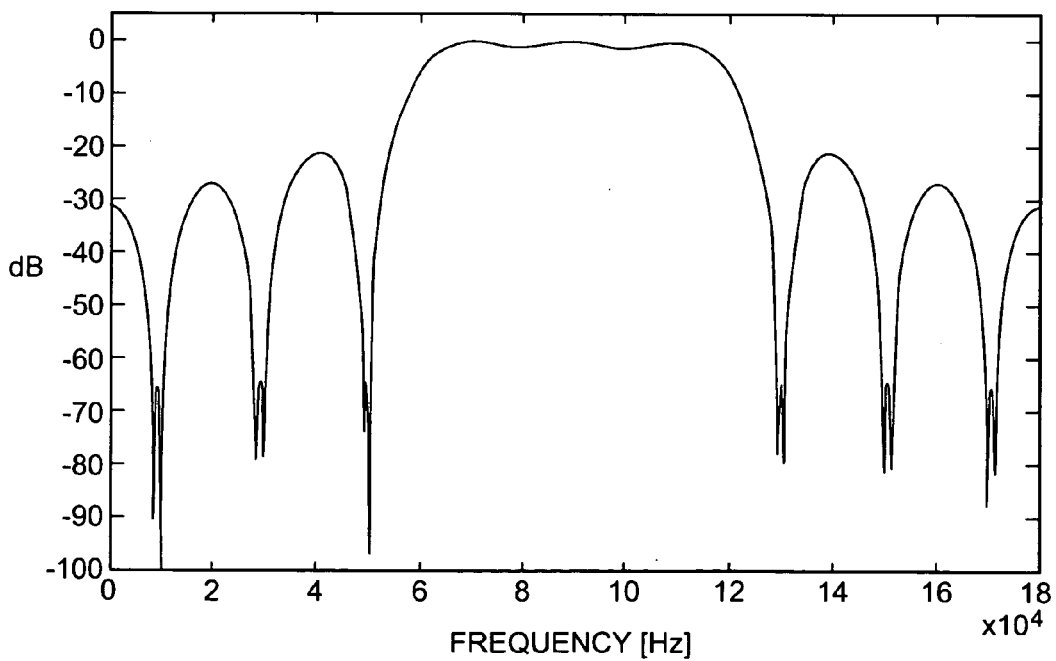
FIG. 23 is a simulated frequency-domain plot illustrating frequency response of the filter of FIG. 22 when implemented at a 360 kHz sample rate.

FIG. 22 illustrates the baseband frequency response of an exemplary digital filter implemented in subsystem 410, across a frequency range twice the Nyquist limit of the filter. FIG. 23 illustrates frequency response of the filter of FIG. 22 when digital subsystem 130 processes signals entering the digital filter at a 360 kHz sample rate. This frequency response has deep but narrow spectral nulls, which provide particular advantages for certain types of calibration signals, as discussed in further detail below.

Figure 24:
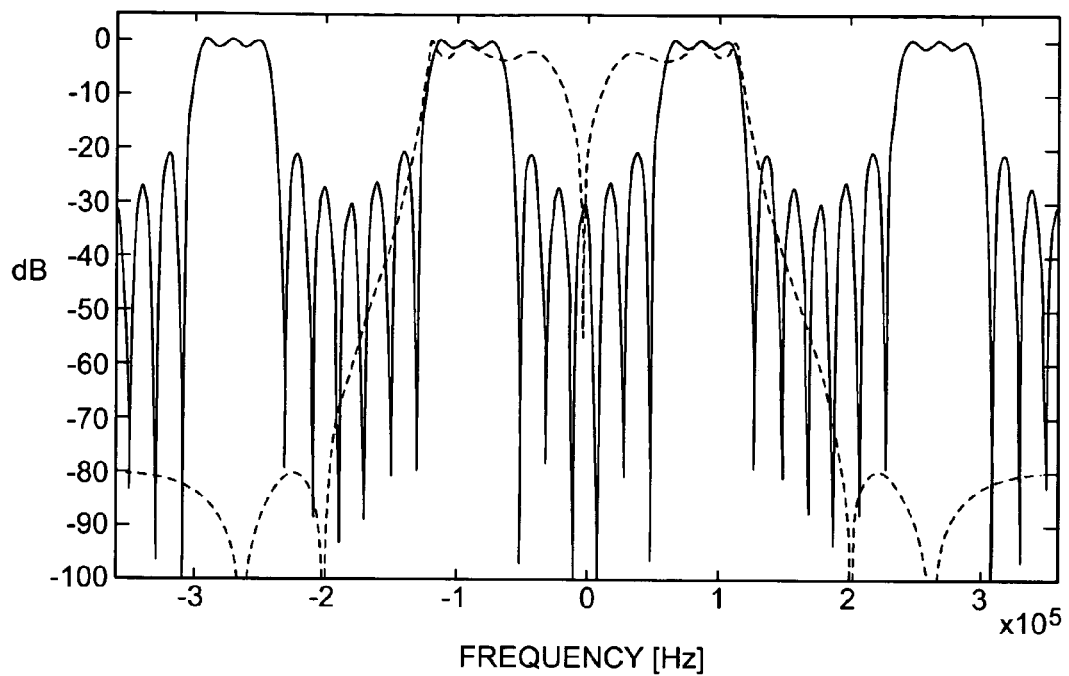
FIG. 24 is a simulated frequency domain plot illustrating frequency response of an exemplary anti-aliasing filter of the receiver of FIG. 1 and the filter of FIG. 22 when implemented at a 360 kHz sample rate.

FIG. 24 is a simulated frequency domain plot illustrating an exemplary frequency response of bandpass filters 118 and 119 in dashed lines and the digital filter of subsystem 410 (when implemented at a 360 kHz sample rate) in solid lines. The frequency response of bandpass filters 118 and 119 reaches a significant level of stop band attenuation by the time the frequency of response of the digital filter reaches its first alias, at about 240 kHz.

Figure 25:
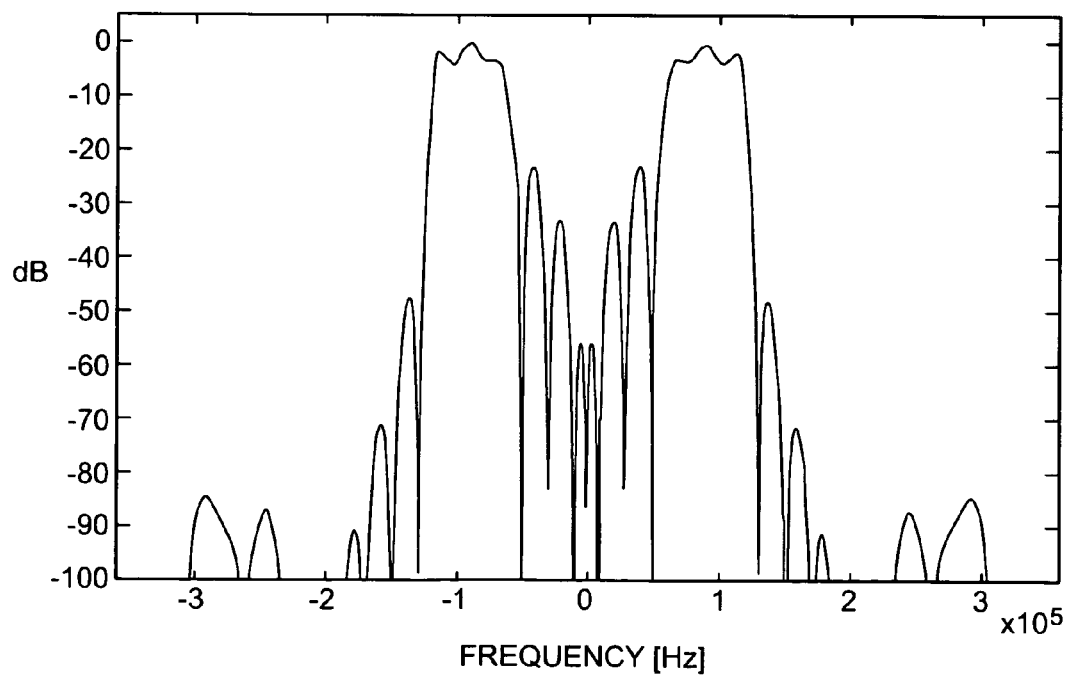
FIG. 25 is a simulated frequency-domain plot illustrating a cascaded frequency response of the filters of FIG. 15.

FIG. 25 is a simulated frequency-domain plot illustrating a cascaded frequency response of bandpass filters 118 and 119 and digital filter of subsystem 410. The respective filters add several dB of ripple to the passband of receiver 100.

A multi-tone calibration signal according to various aspects of the present invention can be employed to correct passband ripple without the need for adaptive equalization of a received signal. The inventive calibration signal can be applied even in communication systems where the benefits of vector mismatch calibration are not required. For example, a conventional superheterodyne receiver can benefit from ripple correction using a phase-coherent calibration signal even though such a receiver may not have multiple signal paths that could benefit from vector mismatch calibration. A calibration signal subsystem according to various aspects of the present invention (e.g., subsystem 150) can be advantageously employed in such a receiver to quickly and efficiently correct ripple across a range of frequencies. A sample modeling and mismatch determination subsystem according to various aspects of the invention can be suitably adapted for calibrating mismatch between a known baseband calibration signal (e.g., S1 of receiver 100) and an observed calibration signal (e.g., S3a, S3b). Such calibration can also be performed in conjunction with vector mismatch calibration. Passband ripple can also be conventionally equalized.

A calibration signal subsystem according to various aspects of the invention includes any suitable hardware and/or software for generating an RF calibration signal having a frequency component at the frequency of a potential RF signal of interest. Such hardware and/or software can be integrated into the circuitry and/or software of a vector calibration system according to the invention, or into a device incorporating such circuitry. Alternatively, separate hardware and/or software can implement functions of a calibration signal subsystem during a one-time calibration process. For example, manufacturing or maintenance test equipment can implement a calibration signal subsystem to perform a one-time calibration of a communication receiver that contains circuitry and software of the inventive vector calibration system. Such a receiver can include a nonvolatile memory device (e.g., flash memory) to retain data resulting from the calibration.

According to a particularly advantageous aspect of the invention, the calibration signal can include multiple RF frequency components (i.e., tones) that the receiver can frequency translate to a single IF frequency range. When the calibration signal comprises multiple tones having predetermined phase and frequency relationships to each other, a vector calibration system of the invention can determine vector mismatch at the frequency of each tone concurrently. As a result, the system can determine mismatch across a range of frequencies simply and efficiently.

Figure 2:
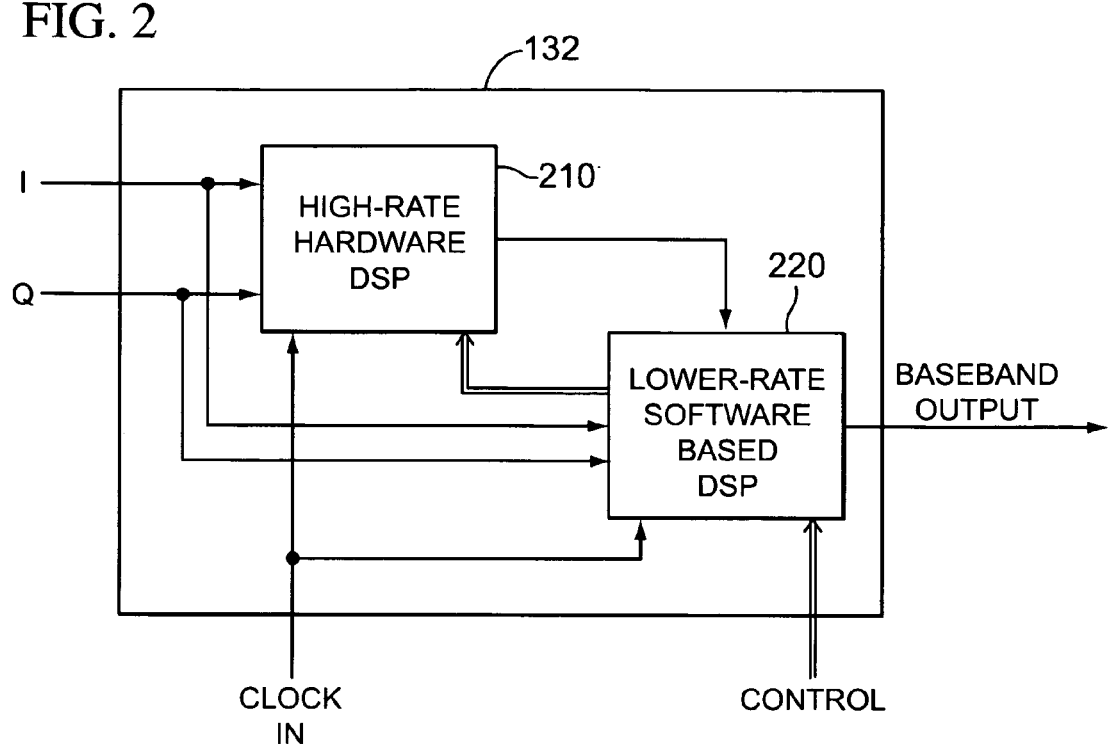
FIG. 2 is a schematic block diagram of a digital signal processor of the receiver of FIG. 1.
Figure 3:
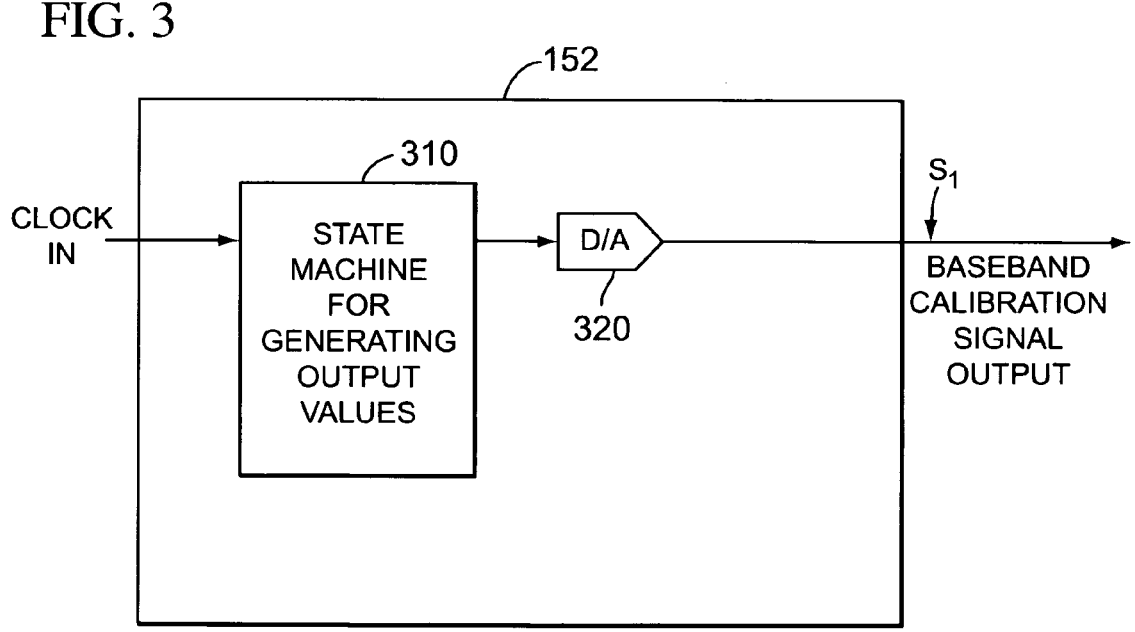
FIG. 3 is a schematic block diagram of a baseband calibration signal generator of the receiver of FIG. 1.

As may be better understood with reference to FIGS. 1–3, exemplary calibration signal subsystem 150 includes a calibration signal generator 152, a mixer 154, and a local oscillator phase adjustor 156. Controlled by clock generator 145, calibration signal generator 150 provides a baseband calibration signal S1 having multiple tones, as is preferred, within the low-IF frequency range of receiver 100. Mixer 154 translates calibration signal S1 to an RF calibration signal S2 in the RF frequency range of several potential signals of interest, e.g., adjacent channels of a channelized frequency spectrum. Mixer 154 uses the same output signal of local oscillator 116 that mixer 112 would use when frequency translating one of the potential signals of interest.

According to a particularly advantageous aspect of the present invention, a single local oscillator can provide a shared phase-coherent signal for both translation of the calibration signal from baseband to RF (S1 to S2) and translation of the RF calibration signal back to baseband (S2 to S3a, S3b). For example, the in-phase (O-degree) output of local oscillator 116 feeds both mixer 154 and mixer 112. Phase-synchronous local oscillator signals perform frequency translation of (1) the baseband components from calibration signal generator 152 to RF and (2) the RF-translated calibration signal to its original baseband frequency, within its low-IF frequency range. When it reaches digital subsystem 130, quadrature calibration signals S3a and S3b are phase-synchronous (i.e., having matched frequencies) with basis functions that vector calibration subsystem 400 (FIG. 4) models against the calibration signal to determine vector mismatch. The frequency-translated calibration signals remain phase-synchronous with the basis functions even when the local oscillator output is subject to phase variations.

A calibration signal generator of a calibration signal subsystem (e.g., subsystem 150) can provide a baseband calibration signal by any suitable technique, using analog and/or digital signal processing. As may be better understood with reference to FIG. 3, for example, calibration signal generator 152 generates a three-tone calibration signal S1 primarily using digital signal processing. (The tones of this exemplary signal are not necessarily phase-optimized for minimum peak amplitude, but lack of such optimization is not important for a signal having only three tones.) Generator 152 includes a state machine 310 for generating digital output values and a D/A converter 320. State machine 310 changes states at a 180 kHz rate, as controlled by a clock signal (e.g., 360 kHz) from clock generator 145. Each time state machine 310 changes states, it provides a new digital output that D/A converter 320 converts into an analog sample of the baseband calibration signal S1. Lowpass filtering can follow D/A converter 320 to limit the bandwidth of the RF calibration signal provided by mixer 154.

TABLE I below illustrates exemplary output values of signal generator 152 for a baseband calibration signal having three primary tones. When provided periodically at a sample rate of 180 kHz, these 18 output values form a periodic calibration signal with tones at 70 kHz, 90 kHz, and 110 kHz. The 110 kHz frequency component is the first alias of the 70 kHz component. State machine 310 can generate these values using five preset multipliers labeled A,B,C,D, and zero with varying sign. Thus, state machine 310 needs only to store four separate digital values. State machine 310 can provide any desired one of the 18 repeated output values of TABLE I by selecting the desired digital value and multiplying it by the desired +/−sign.

In a variation of baseband calibration signal generator 152, the preset multipliers are integrated into D/A converter 320. In such a variation, D/A converter 320 is only capable of providing nine distinct output values. (These are the four preset multipliers with both possible signs plus zero.) Such a variation is particularly inexpensive to implement on an integrated circuit that already includes precision analog circuitry, for example circuitry implementing functions of frequency translation subsystem 110.

TABLE I

| Sample | Output | Preset Multiplier |
|---|---|---|
| 0 | 0.16666666666667 | +A |
| 1 | −0.14067160479100 | −B |
| 2 | 0.07484979751855 | +C |
| 3 | 0.00000000000000 | Zero |
| 4 | −0.04885473564288 | −D |
| 5 | 0.04885473564288 | +D |
| 6 | 0.00000000000000 | Zero |
| 7 | −0.07484979751855 | −C |
| 8 | 0.14067160479100 | +B |
| 9 | −0.16666666666667 | −A |
| 10 | 0.14067160479100 | +B |
| 11 | −0.07484979751855 | −C |
| 12 | 0.00000000000000 | Zero |
| 13 | 0.04885473564288 | +D |
| 14 | −0.04885473564288 | −D |
| 15 | 0.00000000000000 | Zero |
| 16 | 0.07484979751855 | +C |
| 17 | −0.14067160479100 | −B |

In an advantageous variation of calibration signal subsystem 150, baseband calibration signal generator 152 generates a harmonic rich baseband calibration signal S1 (e.g., a square wave) at a desired fundamental frequency (e.g., 10 kHz). The fundamental frequency is selected to produce harmonics at desired calibration tone frequencies. For example, a 10 kHz fundamental square wave modulating mixer 154 will produce harmonics at the offset frequencies of +/−70 kHz, +/−90 kHz, and +/−110 kHz that are desired in receiver 100. The undesired harmonics (e.g., 30, 50, 130 kHz) can be filtered out in digital filtering of sample modeling and mismatch determination subsystem 410. Such filtering may be better understood with reference to exemplary frequency response plots of FIGS. 22–25. This frequency response has deep but narrow spectral nulls at the frequency of the undesired harmonics.

Calibration signal subsystem 150 includes a local oscillator phase adjustor 156, which adjusts the phase of the signal from local oscillator 116 by an amount controlled by control subsystem 140. (Control subsystem 140 can be implemented by software of DSP 132 or in a separate microcontroller IC, clocked by clock generator 145 as illustrated in FIG. 1.) A local oscillator phase adjustor according to various aspects of the present invention can include any structure for varying the propagation delay or phase of a local oscillator signal. An example of a suitable phase adjustor is an electronically variable capacitance device (i.e., a varactor) controlled by an analog voltage from control subsystem 140. The higher the capacitance of such a device, the more it delays local oscillator phase.

Phase adjustor 156 can be controlled to maximize the accuracy of vector mismatch calibration according to any suitable technique. Accuracy can be expected to be optimal when the phase of the local oscillator signal at the input of mixer 154 is midway the phase of that signal at the input of mixers 112 and 114. In other words, the local oscillator signal at the input of mixer 154 is preferably (1) offset +45 from the local oscillator signal at the input of mixer 112 and (2) offset −45 degrees from the local oscillator signal at the input of mixer 114.

When local oscillator phase adjustor 156 has a known control vs. phase shift transfer function (preferably linear over the range of interest), an optimal phase offset can be determined by setting the phase offset to a point midway between two phase offsets that null out calibration signals S3a and S3b, respectively. An exemplary technique for controlling phase adjustor 156 includes steps of (1) adjusting phase adjustor 156 to a first phase setting to minimize amplitude of calibration signal S3a, (2) adjusting phase adjustor 156 to a second phase setting to minimize amplitude of calibration signal S3b, (3) and setting phase adjustor 156 to a third phase setting that is midway between the first phase setting and the second phase setting. For example, if the first phase setting is 10 degrees and the second phase setting is 100 degrees, the third phase setting is determined as 55 degrees.

Appendix B provides disclosure of a method for dealing with an undesired phase offset, which may be instructive in operation of a local oscillator phase adjustor according to various aspects of the present invention.

As may be better understood with reference to FIG. 2, digital signal processor (DSP) 132 can include a high-rate hardware-based DSP 210 and a lower-rate software-based DSP 220. High-rate DSP 210 can be a suitable type of programmable logic device or application-specific integrated circuit performing high-rate digital signal processing for baseband translation of receiver 100. For example, high-rate DSP 210 can implement signal processing blocks 38, 40, 64, and 66 of receiver 10 of the '341 patent, as illustrated in FIG. 8 of that patent. Low-rate DSP 220 can be a suitable type of software-programmable DSP (e.g., of the type available from Analog Devices, Texas Instruments, etc.) for performing low-rate digital signal processing after decimation by high-rate DSP 210. For example, low-rate DSP 220 can implement signal processing blocks 70, 68, 72, 74, and 76 of receiver 10 of the '341 patent.

During vector mismatch calibration according to various aspects of the present invention, low-rate DSP 220 acquires observed samples from the I and Q inputs of DSP 132. Although the samples at these inputs are provided at a high sample rate (at the non-decimated input of high-rate DSP 210), only a relatively limited number of samples needs to be processed at a time during vector mismatch calibration. Consequently, low-rate DSP 220 can acquire a block of samples, perform vector mismatch calibration on that block (e.g., using one of exemplary methods 500,600, and 700), store the results of that particular calibration, and repeat the process on another block of samples when available processing time of DSP 220 permits. Repeated results of this block processing can be statistically combined (e.g., averaged) to more accurately determine and/or correct vector mismatch.

Baseband translation performed by DSP 220 can be interrupted for vector mismatch calibration, or the two functions can be performed concurrently. In receiver 100 of FIG. 1, for example, translation of an RF signal of interest to baseband can be interrupted (stopped momentarily), preferably for a short enough time to be unobtrusive to a user or between packets of data transmission. When receiver 100 is interrupted for vector mismatch calibration, switch 106 can couple mixers 112 and 114 to calibration signal subsystem 150 instead of front-end stage 104. Switch 106 is conceptually a single pole-double, throw-switch, preferably implemented as a solid-state alternating-conduction device such as a suitable type of PIN diode. In a variation, a weakly coupled link can be employed to couple calibration signal subsystem 150 to mixers 112 and 114.

Figure 5:
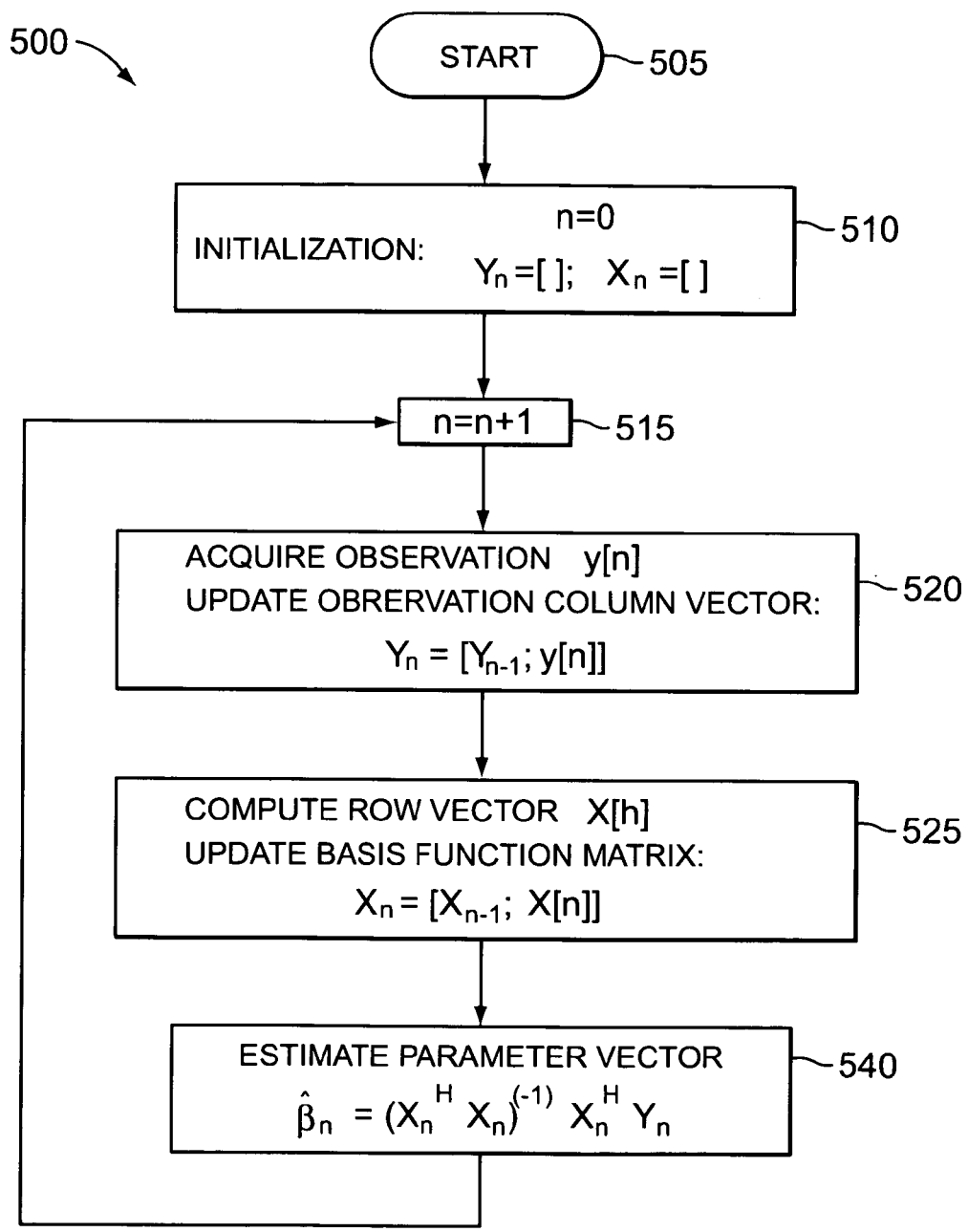
FIG. 5 is a flow diagram of a method of the invention for vector mismatch determination using deterministic least-squares processing.
Figure 6:
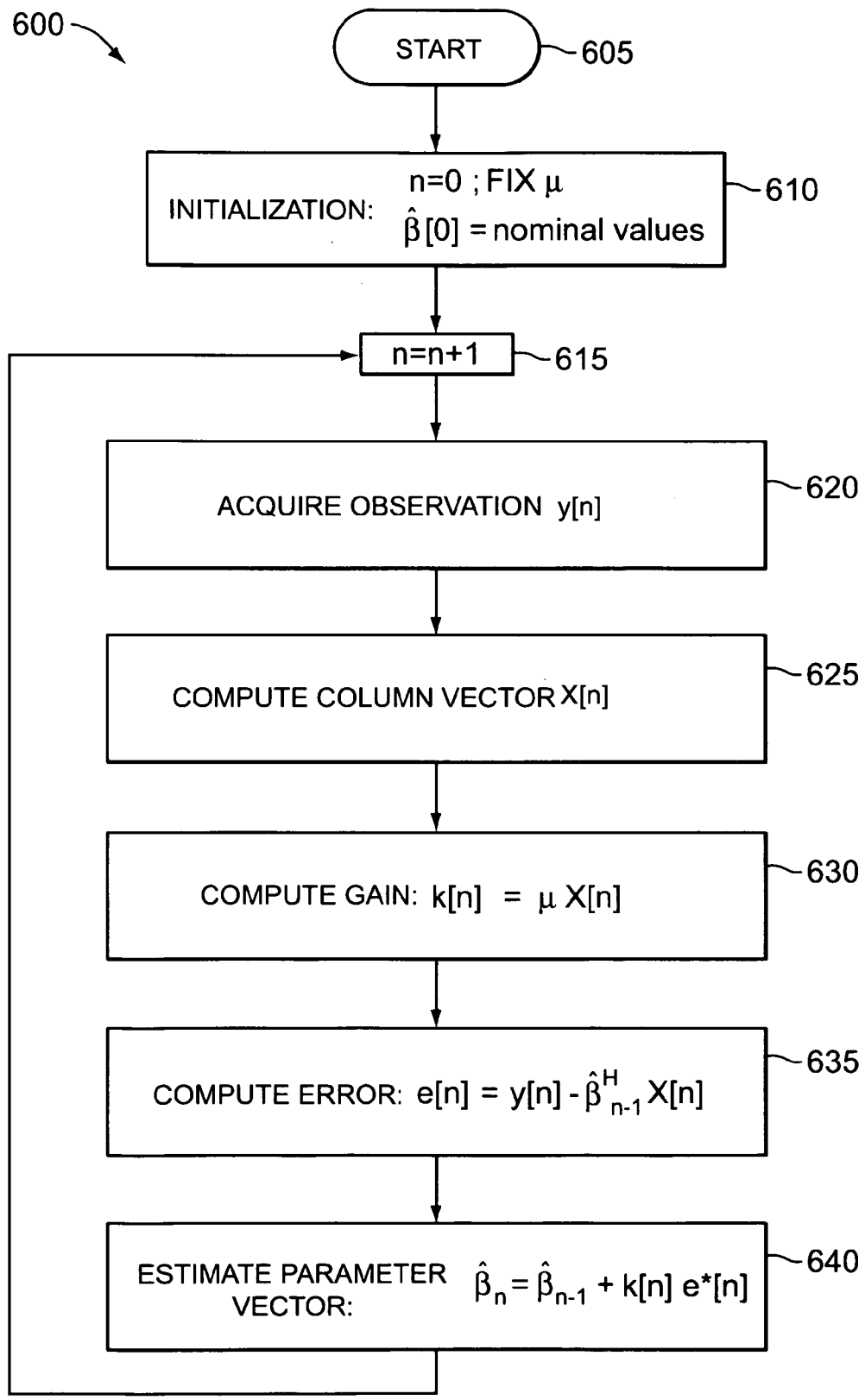
FIG. 6 is a flow diagram of a method of the invention for vector mismatch determination using Least Mean Square (LMS) processing.
Figure 7:
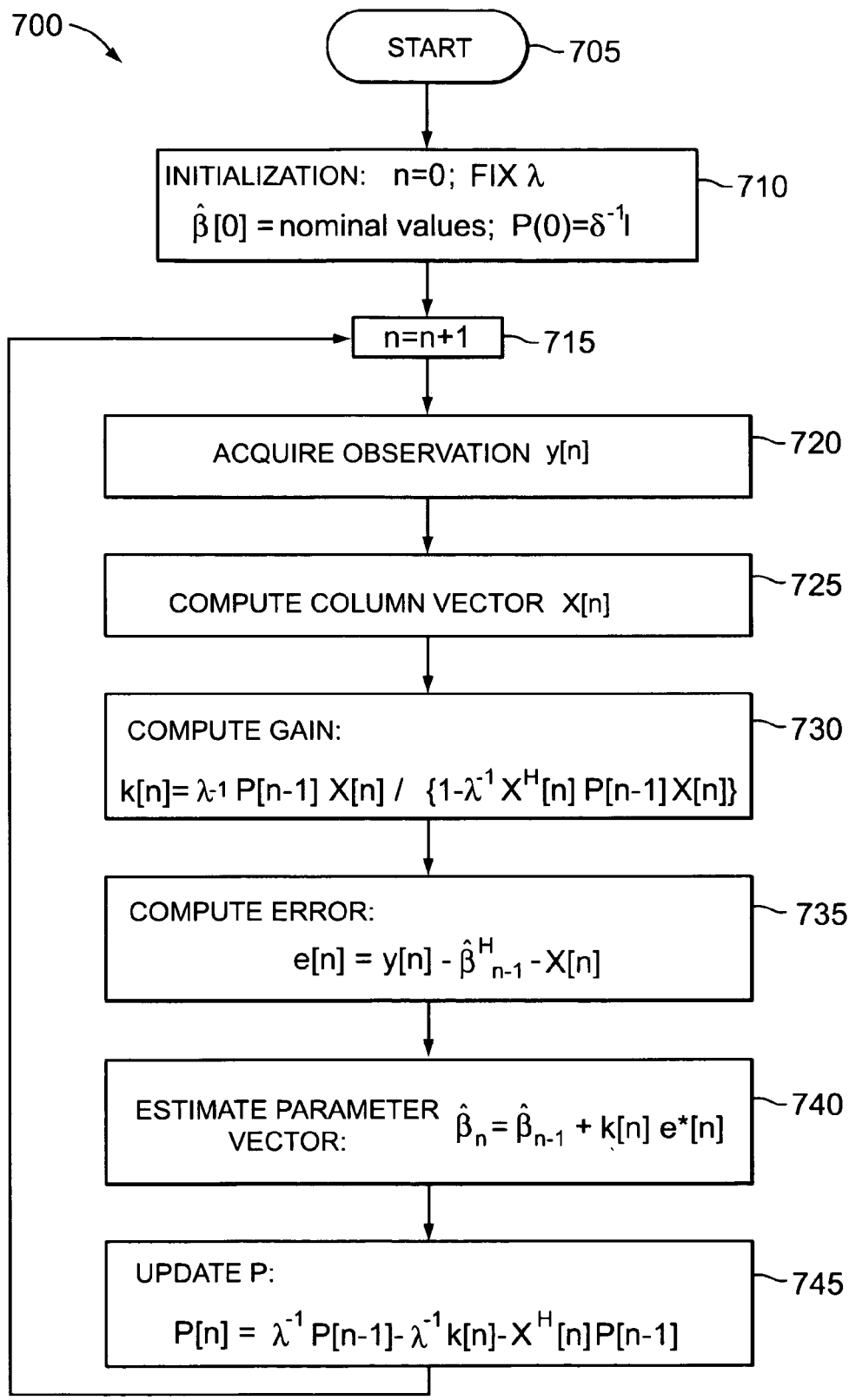
FIG. 7 is a flow diagram of a method of the invention for vector mismatch determination using Recursive Least Square (RLS) processing with an exponential forgetting window.

Three methods of sample modeling and mismatch determination according to various aspects of the present invention to derive an unknown parameter vector $\hat{\beta}$ may be better understood with reference to flow diagrams of FIGS. 5–7 and appendices A, B, and C of the '226 application. The various aspects of the invention disclosed herein and set forth particularly by the exemplary claims below are not limited in any way to the disclosure set forth in the appendices. Further, some statements made in the appendices only apply within a relatively narrow context of communications systems toward which a particular appendix is directed. Descriptions of the appendices are provided in TABLE II below.

TABLE II

| Appendix | Description of Relevance to the Application |
|---|---|
| A | From "An Optimized Multi-Tone Calibration Signal for Quadrature Receiver Communication Systems," submitted by R. A. Green for publication to the 10th IEEE Workshop on Statistical Signal and Array Processing and now published as: IEEE Workshop on Statistical Signal and Array Processing, Aug. 14–16, 2000, pp. 664–667. (Incorporated herein by reference.) This appendix discloses a phase-optimized multi-tone calibration signal according to various aspects of the present invention. A three-tone version of this particularly advantageous type of calibration signal is employed in the simulation of FIGS. 8–12. |
| B | From "A SDB-SC Signal Model for Nonlinear Regression-Based Quadrature Receiver Calibration," listing R. A. Green as author, Proceedings ICASSP 1999, Phoenix, AZ, Mar. 15, 1999, incorporated herein by reference. This appendix presents a two-tone calibration signal consistent with the nonlinear regression techniques presented in Appendix A. This appendix illustrates some of the difficulties involved in construction of alternate calibration signals such as multitone calibration signals. In particular, the appendix details an undesired phase parameter PSI that results from modulating a baseband calibration signal with a carrier tone, and provides a method to accommodate the undesired phase parameter. Phase adjustor 156 of receiver 100 addresses undesired phase offset introduced by modulating a calibration signal with a carrier signal. |
| C | From "Quadrature Receiver Mismatch Calibration," listing R. A. Green, R. C. Anderson-Sprecher, and J. W. Pierre as coauthors, IEEE Transactions on Signal Processing; Vol 47, No. 11, Nov. 1999, incorporated herein by reference. This appendix introduces quadrature receiver calibration over multiple frequencies using nonlinear regression techniques. In this reference, mismatch at each frequency is estimated separately through repeated application of a single-tone calibration signal. Some aspects of the present invention are according to this disclosure, but other aspects offer particular advantages including: simultaneous calibration over multiple frequencies using multitone calibration signals; linear regression models that admit closed-form, real time estimation; and generalization to multiple signal path systems such as array processors. |
| D | Matlab (RTM The Mathworks, Inc.) source code for the simulations of FIGS. 8–25. This code provides a conceptual-level context for the simulation plots. However, it does not carry out an exhaustive simulation of an actual communications system during operation of various aspects of the invention. |

Subsystem 410 of exemplary vector calibration system 400 collects observation values and generates an estimate of the unknown parameter vector, $\hat{\beta}$. For quadrature receiver 100 of FIG. 1, observations are taken from the in-phase and quadrature branches, as sampled and digitized by A/D converters 120 and 122. In variations such as multi-sensor array processors, observations can be taken from other types of signal paths. Typically data are collected simultaneously from each signal path at a uniform sampling rate. However, a calibration system according to various aspects of the present invention permits non-uniform sampling as well as sampling of signal paths at different times.

Subsystem 410 normally employs one of two general class of algorithm. Recursive algorithms provide new parameter estimates with each new observation set. Non-recursive algorithms provide parameter estimates less frequently; typically estimates are computed after a block of samples is collected. Deterministic least squares, for example, is typically a non-recursive algorithm that post-processes data. Adaptive techniques are often recursive and permit real-time parameter estimation. Real-time operation is important to accommodate systems that possess slow time variations in the unknown parameters $\beta$.

Many methods exist to estimate the unknown parameters. When observations are expressed as a linear combination of basis functions and unknown parameters plus noise ($Y=X\beta+\epsilon$), efficient parameter estimation is accomplished using techniques such as deterministic least-squares or adaptive techniques such as the Least Mean Square (LMS) algorithm and the Exponential Forgetting Window Recursive Least Squares (EFW-RLS) algorithms. Guidance as to implementation of such techniques may be found in Simon Haykin, "Adaptive Filter Theory", 2nd edition, Prentice Hall Inc., 1991, referred to herein as "Haykin" and incorporated herein by reference. FIGS. 5, 6, and 7 illustrate methods 500, 600, and 700 of recursive parameter estimation (given a linear model) using deterministic least-squares, LMS, and EFW-RLS, respectively. Sometimes the calibration signal requires a nonlinear model. In these cases, nonlinear regression techniques can be applied to generate parameter estimates, as discussed in Appendix A.

Algorithm 500 illustrates a recursive implementation of deterministic least squares. This approach is taken for consistency with methods 600 and 700. However, the computational burden of this implementation of deterministic least squares increases with the amount of data collected, so it is not often used in practice. Rather, deterministic least squares normally post-processes data to estimate unknown parameters. In a variation of method 500 for standard post-processing, step 540 is skipped until all data is collected.

Method 500 begins at step 505. Step 510 is executed once to initialize system parameters. Specifically, a sample index n is set to zero, an observation vector $Y_n$ is cleared, and a basis function matrix $X_n$ is also cleared. The types of elements of $X_n$ depend on the particular calibration signal employed, as well as the number of frequencies at which vector mismatch is to be determined.

Step 515 begins the main loop of the algorithm by incrementing the sample index n. Step 520 acquires and stores samples of the observation y[n]. Method 500 can be applied to signal paths separately or in combinations, e.g., with I and Q samples interleaved. If method 500 is applied to each signal path separately, y[n] is simply a sample of that signal path at time index n. If method 500 is applied to the collection of signal paths, samples from each signal path are typically stacked into y[n]. Deterministic least squares requires all data points to be saved, so the new sample is stored into a vector of observations $Y_n$ that contains all samples from beginning step 515 to the current time index n.

Step 525 computes the known basis functions X[n] for the current index n. Computation can be avoided through the use of a data look up table. The length of this row vector depends on the number of signal paths being processed, the calibration signal, and the number of frequency bins of interest. For example, calibration of mismatch between quadrature signal paths using a calibration signal with three tones requires that X[n] is a length-6 row vector. In this example, $$X[n]=[\cos(\overline{\omega}_1 t+\theta_1), \sin(\overline{\omega}_1 t+\theta_1), \cos(\overline{\omega}_2 t+\theta_2), \sin(\overline{\omega}_2 t+\theta_2), \cos(\overline{\omega}_3 t+\theta_3), \sin(\overline{\omega}_3 t+\theta_3)]$$

where $\overline{\omega}$ are the calibration tone frequencies and $\theta$ are the optimized phases. Simultaneous processing of both the I and Q branches using the same calibration signal requires that X[n] is a length-12 vector. The row vector X[n] is stored into the $n^{th}$ row of the matrix $X_n$.

Step 540 determines the parameter estimate using the equation $\hat{\beta}n=(X_n^H X_n)^{(-1)} X_n^H Y_n$. Here, $^{(-1)}$ designates a matrix inverse operation and $^H$ indicates the complex-conjugate transpose operation. As indicated above, standard deterministic least-squares would skip step 540 until all data had been collected. By applying method 500 to relatively short-length data sets, however, non-stationarities in the parameters $\beta$ can be accommodated. The column vector $\beta$ has the same length as X[n].

An exemplary implementation of vector calibration with the LMS algorithm may be better understood with reference to FIG. 6. The computational burden of the LMS algorithm remains constant with the addition of data. The LMS algorithm is very simple to implement, and thus it is relatively easy to achieve real-time operation even with relatively modest DSP resources. LMS does not converge as quickly as other adaptive algorithms, but the robust nature of the algorithm has made it a popular choice in adaptive signal processing applications.

A bounded version of the LMS algorithm has been shown to have desirable convergence behavior. The bounded version simply constrains the values attained by the algorithm to a pre-determined bounded region. Further information instructive for implementing the bounded version of the LMS algorithm is found in D. C. Farden, "Tracking Properties of Adaptive Signal Processing Algorithms," IEEE Trans. Acoust., Speech, and Signal Processing, ASSP-29, June 1981, pp. 439–446, incorporated herein by reference. In a bounded version of method 600, step 640 is suitably modified.

Method 600 of FIG. 6 begins at step 605. Step 610 is executed once to initialize system parameters. Specifically, the sample index n is set to zero, the initial parameter estimates $\hat{\beta}_0$ are set to nominal values, and the step-parameter $\mu$ is set according to particular conditions of the communications system in which method 600 is implemented, e.g., receiver 100. The step parameter $\mu$ affects convergence rates as well as the ability of the algorithm to track temporal variations in the unknown parameters $\beta$. Published references such as Haykin provide basic rules for establishing $\mu$. As a general rule, $\mu$ is a small value. For systems with little or no parameter variation, small $\mu$ can reduce estimate variance but also slows convergence. Larger $\mu$ allows the algorithm to track more rapid parameter variations but with less accuracy.

Step 615 begins the main loop of method 600 by incrementing the sample index n. Step 620 acquires and stores the observation y[n]. Method 600 can be applied to signal path separately or in combination. If method 600 is applied to each signal path separately, y[n] is simply a sample of that signal path at time index n. If method 600 is applied to multiple signal paths, samples from each signal path can be interleaved into y[n]. Only the current set of observations needs to be stored in method 600.

Step 625 computes the known basis functions X[n] for the current index n. Computation can be avoided through the use of a data look-up table. The length of this column vector depends on the number of signal paths being processed as well as the number of frequency bins of interest. For example, quadrature mismatch calibration of a quadrature receiver using a calibration signal with three tones requires that X[n] is a length-6 column vector. In this example, $$X[n] = \begin{bmatrix} \cos(\bar{\omega}_1 t + \theta_1) \\ \sin(\bar{\omega}_1 t + \theta_1) \\ \cos(\bar{\omega}_2 t + \theta_2) \\ \sin(\bar{\omega}_2 t + \theta_2) \\ \cos(\bar{\omega}_3 t + \theta_3) \\ \sin(\bar{\omega}_3 t + \theta_3) \end{bmatrix}$$

where $\bar{\omega}$ are the calibration tone frequencies and $\theta$ are optimized phases, selected to minimize the peak amplitude of the signal. Simultaneous processing of two signal paths (e.g., I and Q) using the same calibration signal requires $X[n]$ to be a length-12 vector. Only the basis functions for the current index are required.

In a variation, basis functions can be complex exponentials instead of sines and cosines. Conceptually, the two types of basis functions are the same. However, with complex exponentials, a single basis functions forms orthogonal basis for a single tone. With sines and cosines, two basis functions for an orthogonal basis for a single tone.

Step 630 computes a gain term $k[n]=\mu X[n]$. The gain term is used to weight the error term $e[n]=y[n]-\hat{\beta}_{n-1}^H X[n]$ computed in step 635. The unknown parameter vector is estimated in step 630 according to $\hat{\beta}_n = \hat{\beta}_{n-1}+k[n]e^*[n]$. Here, * represents complex conjugation. The column vector $\beta$ has the same dimension as $X[n]$.

An exemplary implementation of vector calibration with an "exponential forgetting window-recursive least squares" algorithm according to various aspects of the present invention may be better understood with reference to FIG. 7. The computational burden of the LMS algorithm remains constant with the addition of data. EFW-RLS converges more quickly than LMS, but performance is not as robust to model deviations. The EFW-RLS algorithm is moderately complex to implement, but real-time operation is still possible using today's modern DSP technology.

Method 700 of FIG. 7 begins at step 705. Step 710 is executed once to initialize system parameters. Specifically, a sample index n is set to zero, an initial parameter estimates $\hat{\beta}_0$ are set to nominal values, and a "forgetting factor" $\lambda$ is set according to particular communication system conditions. The forgetting factor affects convergence rates as well as the ability of the algorithm to track temporal variations in the unknown parameters $\beta$. Published references such as Haykin provide basic rules for establishing $\lambda$. By setting the forgetting factor to one, there is no loss and the results are similar to deterministic least squares. For $\lambda<1$, old data are given less weight. This approach allows temporal variation of parameters, as is typical with component drift in analog systems. A parameter P used in computations is initialized to $P[0]=\delta^{-1}I$. Here, $\delta$ is a small positive constant (Haykin provides pertinent details) and I is an identity matrix with dimension equal to the number of unknown parameters. (The matrix "I" of this example is not to be confused with the in-phase signal path labeled "I" in FIG. 4.)

Step 715 begins the main loop of method 700 by incrementing the sample index n. Step 720 acquires and stores the observation y[n]. Method 700 can be applied to signal path, separately or in combination. If method 700 is applied to each signal path separately, y[n] is simply a sample of that signal path at time index n. If method 700 is applied to multiple signal paths, samples from each signal path can be interleaved into y[n]. Only the current set of observations needs to be stored in method 700.

Step 725 computes the known basis functions $X[n]$ for the current index n. Computation can be avoided through the use of a data look up table. The length of this column vector depends on the number of signal paths being processed as well as the number of frequency bins of interest. For example, I-branch processing of a quadrature receiver using a calibration signal with three tones requires that $X[n]$ is a length-6 column vector. In this example, $$X[n] = \begin{bmatrix} \cos(\bar{\omega}_1 t + \theta_1) \\ \sin(\bar{\omega}_1 t + \theta_1) \\ \cos(\bar{\omega}_2 t + \theta_2) \\ \sin(\bar{\omega}_2 t + \theta_2) \\ \cos(\bar{\omega}_3 t + \theta_3) \\ \sin(\bar{\omega}_3 t + \theta_3) \end{bmatrix}$$

where $\bar{\omega}$ are the calibration tone frequencies and $\theta$ are optimized phases. Simultaneous processing of both the I and Q branches using the same calibration signal requires that $X[n]$ is a length-12 vector. Only the basis functions for the current index are required.

Step 730 computes a gain term $k[n]=\lambda^{-1}P[n-1]X[n]\{1-\lambda^{-1}X^H[n]P[n-1]X[n]\}$. In this expression, P is a variable defined simply for convenient computation. The gain term is used to weight the error term $e[n]=y[n]-\hat{\beta}_{n-1}^H X[n]$ computed in step 635. The unknown parameter vector is estimated in step 730 according to $\hat{\beta}_n = \hat{\beta}_{n-1}+k[n]e^*[n]$. Here, * represents complex conjugation. Finally, step 745 computes the next value of P, $P[n]=\lambda^{-1}P[n-1]-\lambda^{-1}k[n]X^H[n]P[n-1]$, which is needed for the next recursion.

While the present invention has been described in terms of preferred embodiments and generally associated methods, the inventors contemplate that alterations and permutations of the preferred embodiments and method will become apparent to those skilled in the art upon a reading of the specification and a study of the drawings. For example, vector mismatch between signal paths of an array processor can be determined instead of mismatch between quadrature signal paths of a quadrature receiver.

Figure 26:
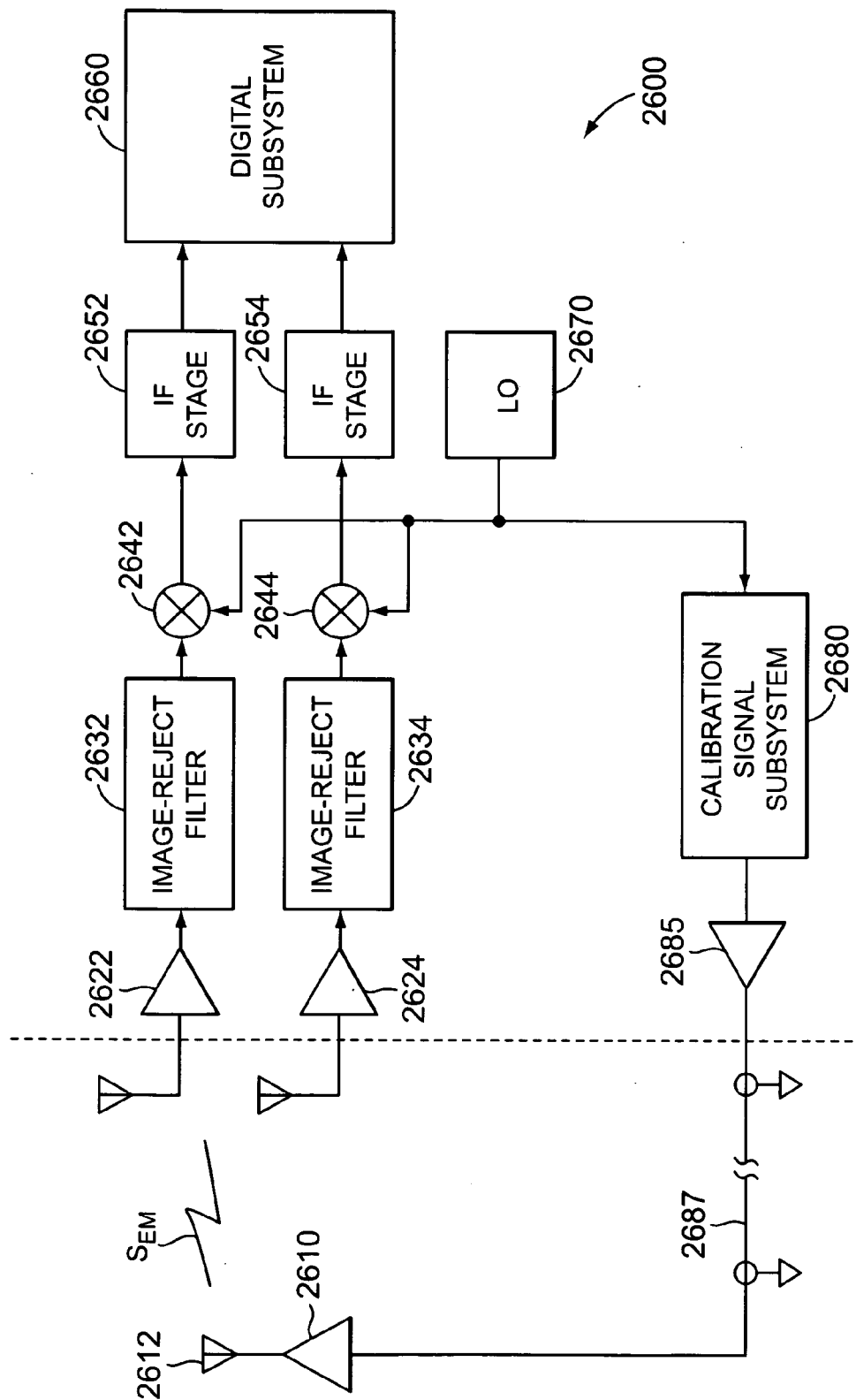
FIG. 26 is a schematic block diagram of an array processor implementing functions of a vector calibration system according to various aspects of the present invention.

An exemplary array processor 2600 employing vector mismatch calibration according to various aspects of the present invention may be better understood with reference to FIG. 26. Array processor 2600 includes conventional circuitry for superheterodyne RF frequency translation and digital array processor of translated signals. The circuitry includes front-end stages 2622 and 2624 coupled to image-reject filters 2632 and 2634, which are in turn coupled to mixers 2642 and 2644, which are coupled to IF stages 2652 and 2654. Digital subsystem 2660 digitizes signal that are suitably selected and amplified by IF stages 2652 and 2654 and performs array processing on the digitized signals. Mixers 2642 and 2644 are fed by local oscillator signals from local oscillator 2670.

Array processor 2600 further includes circuitry for implementing vector mismatch calibration according various aspects of the present invention. The circuitry includes calibration signal subsystem 2680, amplifier 2685, RF transmission path 2687, another amplifier 2610, an antenna 2612. Calibration signal subsystem 2680 generates a phase-coherent calibration signal (as is preferred) and sends the signal to amplifier 2685, which amplifies the signal for transmission through transmission path 2687. Amplifier 2610 further amplifies the signal for transmission through antenna 2612. Antenna 2612 is suitably placed at a predetermined (or fixed) position with respect to array elements coupled to amplifiers 2622 and 2624. Because the position of 2612 with respect to the array elements is fixed, desired or known calibration signals can be modeled against signals received from IF stages 2652 and 2654. Thus, vector mismatch can be determined and/or corrected between a signal path for one array element (e.g., including front-end stage 2622, image-reject filter 2632, mixer 2642, and IF stage 2652) and a signal path for another array element (e.g., including front-end stage 2624, image—image-reject filter 2634, mixer 2644, and IF stage 2654).

Although a predetermined position for antenna 2612 is preferred, antenna 2612 can be placed at an unknown but fixed far-field location in an advantageous variation of array processor 2600. In such a variation, a predetermined phase relationship still exists among the array elements coupled to amplifiers 2622 and 2624, but the relationship is dependent on an unknown angle of arrival. Array processor 2600 can estimate this angle of arrival using conventional techniques (e.g., beamforming, MVDR, MUSIC, root-MUSIC, etc.) and then correct any mismatch. In a further variation, array processor 2600 can update adaptive filtering algorithms to correct mismatch without needing to provide an estimate of the angle of arrival.

Accordingly, neither the above description of preferred exemplary embodiments nor the abstract defines or constrains the present invention. Rather, the issued claims variously define the present invention. Each variation of the present invention is limited only by the recited limitations of its respective claim, and equivalents thereof, without limitation by other terms not present in the claim. Further, aspects of the present invention are particularly pointed out below using terminology that the inventors regard as having its broadest reasonable interpretation; the more specific interpretations of 35 U.S.C. § 112(6) are only intended in those instances where the term "means" is actually recited.

In addition, the inventors contemplate that their inventions include all methods that can be practiced from all suitable combinations of the method claims filed with the application, as well as all apparatus and systems that can be formed from all suitable combinations of the apparatus and system claims filed with the application.

What is claimed is:

1. A method for determining vector mismatch between a plurality of signal paths in a signal processing system, the method comprising:
   (a) providing a periodic calibration signal having a plurality of tones;
   (b) frequency translating the calibration signal using the signal processing system to provide a set of observed samples;
   (c) comparing the set of observed samples to a set of samples modeled by a function of parameters including an estimated vector mismatch and a plurality of basis functions; and
   (d) determining, at least to an estimate, a value of vector mismatch that minimizes the difference between the set of observed samples and the set of modeled samples.

2. The method of claim 1 wherein:
   (a) the signal paths include an in-phase signal path and a quadrature signal path; and
   (b) vector mismatch includes deviation from a quadrature relationship between the in-phase signal path and the quadrature signal path.

3. The method of claim 1 wherein:
   (a) the signal paths include a plurality of signal paths coupled to respective elements of a spatially selective array; and
   (b) vector mismatch includes deviations from a predetermined phase and amplitude relationship between each respective one of the plurality of signal paths, the deviations degrading spatial selectivity of the array.

4. The method of claim 3 further comprising transmitting the calibration signal through an antenna placed at a fixed position with respect to the array elements.

5. The method of claim 1 wherein the number of samples in the set of modeled samples is significantly greater than the number of parameters of the function, whereby the function is overdetermined.

6. The method of claim 1 further comprising:
   (a) providing a plurality of sets of observed samples;
   (b) comparing each set of observed samples to a respective set of samples modeled as said function of parameters;
   (c) determining, at least to an estimate, a value of vector mismatch that minimizes the difference between each set of observed samples and each respective set of modeled samples; and
   (d) statistically combining the values of vector mismatch determined for each one of the plurality of sets of observed samples.

7. The method of claim 1 wherein the determined vector mismatch includes a first value representative of phase mismatch and a second value representative of gain mismatch, the values being representative of mismatches between the signal paths.

8. The method of claim 7 wherein:
   (a) the determined vector mismatch includes a plurality of phase and gain mismatch values;
   (b) the plurality of phase and gain mismatch values includes a phase and gain mismatch value for each one of the plurality of tones; and
   (c) each one of the plurality of phase and gain mismatch values is representative of vector mismatch between the signal paths from frequency translation of one of the plurality of tones.

9. The method of claim 1 wherein the parameters further include a parameter indicative of at least one environmental condition.

10. The method of claim 9 wherein the environmental condition is a temperature.

11. The method of claim 9 wherein the environmental condition is a local oscillator frequency.

12. The method of claim 1 wherein each one of the plurality of basis functions forms an orthogonal basis for each one of the plurality of tones.

13. The method of claim 1 wherein:
   (a) the plurality of basis functions includes a first function set and a second function set; and
   (b) one basis function of the first function set and one basis function of the second function set together form an orthogonal basis for each one of the plurality of tones.

14. The method of claim 13 wherein:
   (a) each one of the plurality of basis functions is sinusoidal and periodic at a frequency equal to the frequency of the tone whose orthogonal basis is formed thereby; and
   (b) each basis function of the first function set is displaced from each basis function of the second function set by a predetermined phase offset to establish a predetermined vector relationship therebetween.

15. The method of claim 1 wherein the value of vector mismatch that minimizes the difference between the set of observed samples and the set of modeled samples is determined by recursive least mean squares.

16. The method of claim 15 wherein the values determined by least mean squares are constrained to a predetermined bounded region.

17. The method of claim 1 wherein the value of vector mismatch that minimizes the difference between the set of observed samples and the set of modeled samples is determined by recursive least squares with an exponential forgetting window.

18. The method of claim 1 wherein:
   (a) the function is a linear product of
      (1) a matrix of results of the basis functions; and
      (2) a parameter vector of variables representative of the vector mismatch; and
   (b) the value of vector mismatch that minimizes the difference between the set of observed samples and the set of modeled samples is determined by linear regression estimation of the parameter vector.

19. The method of claim 18 wherein X is the matrix, Y is the observation vector, Z is the parameter vector, and the linear regression estimation is determined according to the formula:

$$Z = (X^T X)^{-1} X^T Y.$$

20. A method in accordance with claim 1 for reducing vector mismatch between signal paths in the signal processing system, the method further comprising applying at least one of a phase adjustment and a gain adjustment to at least one of the signal paths.

21. The method of claim 20 further comprising:
   (a) computing complex exponentials corresponding to the vector mismatch; and
   (b) based on the complex exponentials, deriving coefficients of an impulse response that is inversely representative of the vector mismatch; and
   (c) realizing the impulse response in a digital filter to apply the adjustment.

22. The method of claim 21 wherein the coefficients are derived by applying the complex exponentials to appropriate frequency bands of an inverse fast Fourier transform.

23. The method of claim 21 wherein the digital filter is a finite-impulse-response filter.

24. The method of claim 20 further comprising repeatedly determining vector mismatch and applying a phase and gain adjustment, inverse of the determined vector mismatch, to reduce the vector mismatch.

25. A signal processing system having an in-phase signal path and a quadrature signal path and including a vector mismatch determination system comprising:
   (a) a calibration signal subsystem that, during operation, provides a periodic calibration signal having a plurality of tones;
   (b) a sample modeling and mismatch determination subsystem responsive to the calibration signal to provide a plurality of sets of observed samples and determine vector mismatch between the plurality of signal paths, vector mismatch including deviation from a quadrature relationship between the in-phase signal path and the quadrature signal path, wherein, during operation:
      (1) each set of observed samples is compared to a respective set of samples modeled by a linear product of a parameter vector of variables representative of an estimated vector mismatch and a matrix of results from a plurality of basis functions, the estimated vector mismatch including a plurality of values representative of phase mismatch and a plurality of values representative of gain mismatch at each one of the plurality of tones;
      (2) a value of vector mismatch is determined, at least to an estimate, that minimizes the difference between each set of observed samples and the respective set of modeled samples, the determination being made by a bounded least mean squares algorithm;
      (3) the number of samples in the set of modeled samples is significantly greater than the number of parameters of the function, whereby the function is overdetermined;
      (4) the values of vector mismatch determined for each one of the plurality of sets of observed samples are statistically combined;
      (5) the plurality of basis functions includes a first function set and a second function set, one basis function of the first function set and one basis function of the second function set together forming an orthogonal basis for each one of the plurality of tones;
      (6) each one of the plurality of basis functions is sinusoidal and periodic at a frequency equal to the frequency of the tone whose orthogonal basis is formed thereby; and
      (7) each basis function of the first function set is displaced from each basis function of the second function set by a predetermined phase offset to establish a predetermined vector relationship therebetween.

26. A system in accordance with claim 25 for reducing vector mismatch between quadrature signal paths in the signal processing system, wherein, during operation at least one of a phase adjustment and a gain adjustment is repeatedly determined and applied to at least one of the signal paths, the system further comprising:
   (a) a correction coefficient generator responsive to the determined value of vector mismatch to compute complex exponentials corresponding to the vector mismatch;
   (b) a coefficient generator responsive to the complex exponentials to derive coefficients of an impulse response that is inversely representative of the vector mismatch, the coefficients being derived by applying the complex exponentials to appropriate frequency bands of an inverse fast Fourier transform; and
   (c) a finite-impulse-response digital filter coupled to the coefficient generator to realize the impulse response and apply the adjustment.

27. A signal processing system comprising:
   (a) means for providing a periodic calibration signal having a plurality of tones;
   (b) means for frequency translating the calibration signal to provide a set of observed samples;
   (c) means for comparing the set of observed samples to a set of samples modeled by a function of parameters including an estimated vector mismatch and a plurality of basis functions; and
   (d) means for determining, at least to an estimate, a value of vector mismatch that minimizes the difference between the set of observed samples and the set of modeled samples.

28. A method for determining vector mismatch between a plurality of signal paths in a signal processing system that includes a digital signal processor, the method comprising:
(a) providing a periodic calibration signal;
(b) frequency translating the calibration signal using the signal processing system to provide a plurality of sets of observed samples;
(c) when processing time of the digital signal processor is available, performing a vector mismatch calibration process based on one of the sets of observed samples, the process including:
(1) comparing each set of observed samples to a respective set of samples modeled as a function of parameters including an estimated vector mismatch and a plurality of basis functions; and
(2) determining, at least to an estimate, a value of vector mismatch that minimizes the difference between each set of observed samples and each respective set of modeled samples; and
(d) statistically combining the values of vector mismatch determined for each one of the plurality of sets of observed samples.

29. The method of claim 28 wherein the determined vector mismatch includes a first value representative of phase mismatch and a second value representative of gain mismatch, the values being representative of mismatches between the signal paths.

30. The method of claim 29 wherein:
(a) the determined vector mismatch includes a plurality of phase and gain mismatch values;
(b) the periodic calibration signal has a plurality of tones;
(c) the plurality of values includes a phase and gain mismatch value for each one of the plurality of tones; and
(d) each one of the plurality of values is representative of vector mismatch between the signal paths from frequency translation of one of the plurality of tones.

31. Apparatus for determining vector mismatch between a plurality of signal paths in a signal processing system that includes a digital signal processor, the apparatus comprising:
(a) means for providing a periodic calibration signal;
(b) means for frequency translating the calibration signal to provide a plurality of sets of observed samples;
(c) means for determining when processing time of the digital signal processor is available and, during available processing time, performing a vector mismatch calibration process based on one of the sets of observed samples, the process including:
(1) comparing the set of observed samples to a respective set of samples modeled as a function of parameters including an estimated vector mismatch and a plurality of basis functions; and
(2) determining, at least to an estimate, a value of vector mismatch that minimizes the difference between each set of observed samples and each respective set of modeled samples; and
(d) means for statistically combining the values of vector mismatch determined for each one of the plurality of sets of observed samples.

32. A signal processing system having an in-phase signal path and a quadrature signal path and including a vector mismatch determination system comprising:
(a) a calibration signal subsystem that, during operation, provides a periodic calibration signal having a plurality of tones; and
(b) a sample modeling and mismatch determination subsystem responsive to the calibration signal to provide a plurality of sets of observed samples and determine vector mismatch between the plurality of signal paths, vector mismatch including deviation from a quadrature relationship between the in-phase signal path and the quadrature signal path, wherein, during operation:
(1) each set of observed samples is compared to a respective set of samples modeled by a function of parameters including an estimated vector mismatch and a plurality of basis functions; and
(2) a value of vector mismatch is determined, at least to an estimate, that minimizes the difference between each set of observed samples and the respective set of modeled samples.

33. The system of claim 32 wherein the vector mismatch determined by the sample modeling and mismatch determination subsystem responsive to the calibration signal includes: (a) a first value representative of phase mismatch between the in-phase and quadrature signal paths and (b) a second value representative of gain mismatch between the in-phase and quadrature signal paths.

34. The system of claim 33 wherein:
(a) the determined vector mismatch includes a plurality of phase and gain mismatch values;
(b) the plurality of values includes a phase and gain mismatch value for each one of the plurality of tones of the periodic calibration signal; and
(c) each one of the plurality of values is representative of vector mismatch between the in-phase and quadrature signal paths from frequency translation of one of the plurality of tones.

35. Apparatus for determining vector mismatch between a plurality of signal paths in a signal processing system that includes a digital signal processor, the apparatus comprising:
(a) means for providing a periodic calibration signal;
(b) means for frequency translating the calibration signal to provide a plurality of sets of observed samples;
(c) means for determining when processing time of the digital signal processor is available and, during available processing time, performing a vector mismatch calibration process based on one of the sets of observed samples, the process including:
(1) comparing each set of observed samples to a respective set of samples modeled as a function of parameters including an estimated vector mismatch and a plurality of basis functions; and
(2) determining, at least to an estimate, a value of vector mismatch that minimizes the difference between each set of observed samples and each respective set of modeled samples; and
(d) means for statistically combining the values of vector mismatch determined for each one of the plurality of sets of observed samples.

36. The apparatus of claim 35 wherein the vector calibration process performed by the means of part (c) includes determining, at least to an estimate, a value of vector mismatch that includes a first value representative of phase mismatch and a second value representative of gain mismatch, the first value and the second value being representative of mismatches between the signal paths.

37. The apparatus of claim 36 wherein:
(a) the determined vector mismatch includes a plurality of phase and gain mismatch values;
(b) the periodic calibration signal has a plurality of tones;
(c) the plurality of values includes a phase and gain mismatch value for each one of the plurality of tones; and (d) each one of the plurality of values is representative of vector mismatch between the signal paths from frequency translation of one of the plurality of tones.

38. A signal processing system having an in-phase signal path and a quadrature signal path and including a vector mismatch determination system comprising:
- (a) a calibration signal subsystem that, during operation, provides a periodic calibration signal having a plurality of tones; and
- (b) a sample modeling and mismatch determination subsystem including a digital signal processor and responsive to a determination of when processing time of the digital signal processor is available, wherein, during operation:
  - (1) during available processing time, the sample modeling and mismatch determination subsystem is responsive to the calibration signal to provide a plurality of sets of observed samples and determine vector mismatch between the plurality of signal paths, vector mismatch including deviation from a quadrature relationship between the in-phase signal path and the quadrature signal path;
  - (2) each set of observed samples is compared to a respective set of samples modeled by a function of parameters including an estimated vector mismatch and a plurality of basis functions; and
  - (3) a value of vector mismatch is determined, at least to an estimate, that minimizes the difference between each set of observed samples and the set of modeled samples.

39. The system of claim 38 wherein the vector mismatch determined by the sample modeling and mismatch determination subsystem responsible to the calibration signal includes a plurality of deviations from a quadrature relationship between the in-phase and quadrature signal paths, one for each one of the plurality of tones of the calibration signal.

* * * * *